United States Patent [19]
Fukui et al.

[11] Patent Number: 5,585,927
[45] Date of Patent: Dec. 17, 1996

[54] DIGITAL IMAGE FORMING APPARATUS HAVING GRADATION CHARACTERISTIC SETTING MEANS

[75] Inventors: Kazuyuki Fukui, Toyohashi; Takanobu Yamada; Yoshinobu Hada; Hiroyuki Ideyama; Yasuhiro Ohno, all of Toyokawa, Japan

[73] Assignee: Minolta Camera Kabushiki Kaisha, Osaka, Japan

[21] Appl. No.: 61,247

[22] Filed: May 17, 1993

[30] Foreign Application Priority Data

May 19, 1992 [JP] Japan .................................. 4-152651

[51] Int. Cl.$^6$ .............................. H04N 1/40; H04N 1/29; G03F 3/08; G03G 21/00
[52] U.S. Cl. .................... 358/298; 358/300; 358/519; 358/521; 358/523; 355/208
[58] Field of Search ........................ 358/298, 296, 358/300, 406, 458, 504, 518, 519, 521, 523; 355/208, 246; 382/167; 400/61, 70, 692; 347/129, 131, 133, 224, 225, 232, 251, 115, 183, 184, 188; 395/110, 115

[56] References Cited

U.S. PATENT DOCUMENTS

| | | | |
|---|---|---|---|
| 4,226,525 | 10/1980 | Sakamoto et al. | 355/14 D |
| 4,227,162 | 7/1981 | Kasahara et al. | 355/14 R |
| 4,367,944 | 11/1983 | Kuru | 355/14 CH |
| 4,583,834 | 4/1986 | Seko et al. | 355/14 C |
| 4,627,712 | 12/1986 | Usami | 355/14 R |
| 4,647,184 | 3/1987 | Russell et al. | 355/14 C |
| 4,647,950 | 3/1987 | Nosaki et al. | 346/160 |
| 4,674,861 | 6/1987 | Kawamura | 355/4 |
| 4,679,057 | 7/1987 | Hamada | 346/76 L |
| 4,689,691 | 8/1987 | Isogai et al. | 358/280 |
| 4,717,964 | 1/1988 | Abe et al. | 358/283 |
| 4,728,989 | 3/1988 | Ohmori | 355/14 R |
| 4,763,199 | 8/1988 | Suzuki | 358/280 |
| 4,782,398 | 11/1988 | Mita | 358/280 |
| 4,800,442 | 1/1989 | Riseman | 358/280 |
| 4,814,886 | 3/1989 | Kuge et al. | 358/293 |
| 4,816,924 | 3/1989 | Sekiya | 358/296 |
| 4,864,419 | 9/1989 | Saito et al. | 358/300 |
| 4,873,428 | 10/1989 | Takeuchi et al. | 250/214 DC |

(List continued on next page.)

FOREIGN PATENT DOCUMENTS

| | | |
|---|---|---|
| 51-33635 | 3/1976 | Japan . |
| 53-115233 | 10/1978 | Japan . |
| 53-116157 | 10/1978 | Japan . |
| 53-136838 | 11/1978 | Japan . |
| 55-15169 | 2/1980 | Japan . |
| 55-29869 | 3/1980 | Japan . |
| 57-76977 | 5/1982 | Japan . |
| 59-140647 | 8/1984 | Japan . |
| 59-161982 | 9/1984 | Japan . |
| 61-61566 | 3/1986 | Japan . |
| 61-94070 | 5/1986 | Japan . |
| 61-118069 | 6/1986 | Japan . |
| 61-214666 | 9/1986 | Japan . |
| 63-296062 | 12/1988 | Japan . |
| 1-196347 | 8/1989 | Japan . |
| 2-268076 | 11/1990 | Japan . |
| 2145598 | 3/1985 | United Kingdom . |

Primary Examiner—Peter S. Wong
Assistant Examiner—Eric Frahm
Attorney, Agent, or Firm—Burns, Doane, Swecker & Mathis, LLP

[57] ABSTRACT

In a digital image forming apparatus, a user can select a desired gradation curve representing the relation of the density of reproduced image to the input image signal obtained by reading a document among a plurality of gradation data stored in a memory in correspondence to image forming conditions of an electrophotographic process of forming an image. The image forming condition is determined separately. A gradation correction data is calculated from the gradation data to realize the object gradation curve. Then, an input image signal is converted to light quantity data for a beam for exposing a photoconductor by using the calculated gradation correction data to form a latent image on a photoconductor in the image forming conditions.

23 Claims, 30 Drawing Sheets

U.S. PATENT DOCUMENTS

| | | | |
|---|---|---|---|
| 4,894,685 | 1/1990 | Shoji | 355/246 |
| 4,903,123 | 2/1990 | Kawamura et al. | 358/75 |
| 4,914,459 | 4/1990 | Mama et al. | 346/160 |
| 4,924,301 | 5/1990 | Surbrook | 358/75 |
| 4,933,776 | 6/1990 | Ikeda | 358/456 |
| 4,958,221 | 9/1990 | Tsuboi et al. | 358/80 |
| 4,958,239 | 9/1990 | Yamada et al. | 358/457 |
| 4,959,687 | 9/1990 | Katoh et al. | 355/214 |
| 4,990,957 | 2/1991 | Nakanishi et al. | 355/228 |
| 5,195,176 | 3/1993 | Lung | 395/115 |
| 5,206,686 | 4/1993 | Fukui et al. | 355/208 |
| 5,235,384 | 8/1993 | Oka et al. | 355/208 |
| 5,305,057 | 4/1994 | Hattori et al. | 355/208 X |
| 5,345,314 | 9/1994 | Ho-Il | 358/296 |

Flower　　　　　Portrait　　　　　Fruit

Color charcters　　Dark picture

DIGITAL IMAGE FORMING APPARATUS HAVING GRADATION CHARACTERISTIC SETTING MEANS

BACKGROUND OF THE INVENTION

1. Field of the Invention

The present invention relates to a digital image processor, or in detail to the gradation control of a digital image forming apparatus such as a digital printer, a digital copying machine and the like.

2. Description of Related Art

In the electrophotographic process in a digital printer, a digital copying machine or the like, multi-level input image signals are obtained by reading a document and the light quantity of the laser beam for exposure is determined according to the image signals to form a latent image. The latent image is developed and transferred on a paper to reproduce the document image. In the image reproduction, it is desirable that the image density (output) after the image reproduction is proportional to the read image density signal (input) obtained by reading a document. The gradation characteristic which is a relation of the output image density against the read image density signal is an important factor which affects largely the impression of a pictorial image.

Then, the light quantity of the laser beam is corrected according to the input density signal to realize the above-mentioned linear relation between the input read data and the output image density. This is called as the gamma correction.

The gradation characteristic changes subtly with the photoconductor sensitivity, the surface potential, the development bias voltage, the development characteristic and the like. Then, the image reproduction is stabilized by using automatic image density control, the gradation correction and the like to realize the linear characteristic.

In a digital image forming apparatus, the read density of a document is converted to multi-level digital data. Because nonlinear conversion of multi-level data is easy by using a look-up table or the like, various types of stabilization control and the gradation characteristic are possible for a digital image forming apparatus. (Refer, for example, to Japanese patent laid open Publication No. 271,764/1991.)

However, the image stabilization is not perfect actually, and the quality of the reproduced image with use of the image stabilization is not satisfactory for some experienced users. Further, if a user can select the gradation characteristic in a wide range, a user can reproduce an image of his or her taste. Then, the inventors consider that the user will be satisfied if he or she can change the gradation characteristic positively.

In order to make it possible for a user to change the gradation characteristic, the gradation correction and the image stabilization have to be operated simultaneously, and a process controller is required suitable for each image reproduction process.

When a user is allowed to change gradation characteristic, if the number of gradation characteristics to be selected increases, the memory capacity for the gradation characteristic data increases to a large extent and this is problem to be solved.

BRIEF SUMMARY OF THE INVENTION

An object of the present invention is to provide a digital image forming machine wherein a user can select a gradation characteristic while using a small memory capacity of the gradation characteristic data.

In a digital image forming apparatus, a user can select a desired gradation curve representing the relationship of the density of the reproduced image to the input image signal obtained by reading a document among a plurality of gradation data. The gradation data are stored in a memory in correspondence to image forming conditions of an electrophotographic process of forming an image, and the image forming conditions are determined separately. Preferably, the gradation data expresses a gradation curve with the piecewise linear approximation. An external memory such as an IC card may also be used to store gradation data. A gradation correction data is calculated from the gradation data selected according to the image forming conditions to realize the object gradation curve. On forming a latent image on a photoconductor in the image forming conditions, an input image signal is converted to light quantity data for a beam for exposing a photoconductor by using the calculated gradation correction data.

A first advantage of the present invention is that the memory capacity for storing the data of gradation correction curves can be decreased to a large extent.

A second advantage of the present invention is that a user can select a gradation curve in a wide range.

A third advantage of the present invention is that the gradation can be adjusted for different kinds of machines.

BRIEF DESCRIPTION OF THE DRAWINGS

These and other objects and features of the present invention will become clear from the following description taken in conjunction with the preferred embodiments thereof with reference to the accompanying drawings, and in which:

FIG. 29 is a diagram of liquid crystal display of an image of the registered programs in the IC card;

FIG. 30 is a diagram of liquid crystal display of an image for inputting a title;

DETAILED DESCRIPTION OF THE PREFERRED EMBODIMENTS

Figure 1:
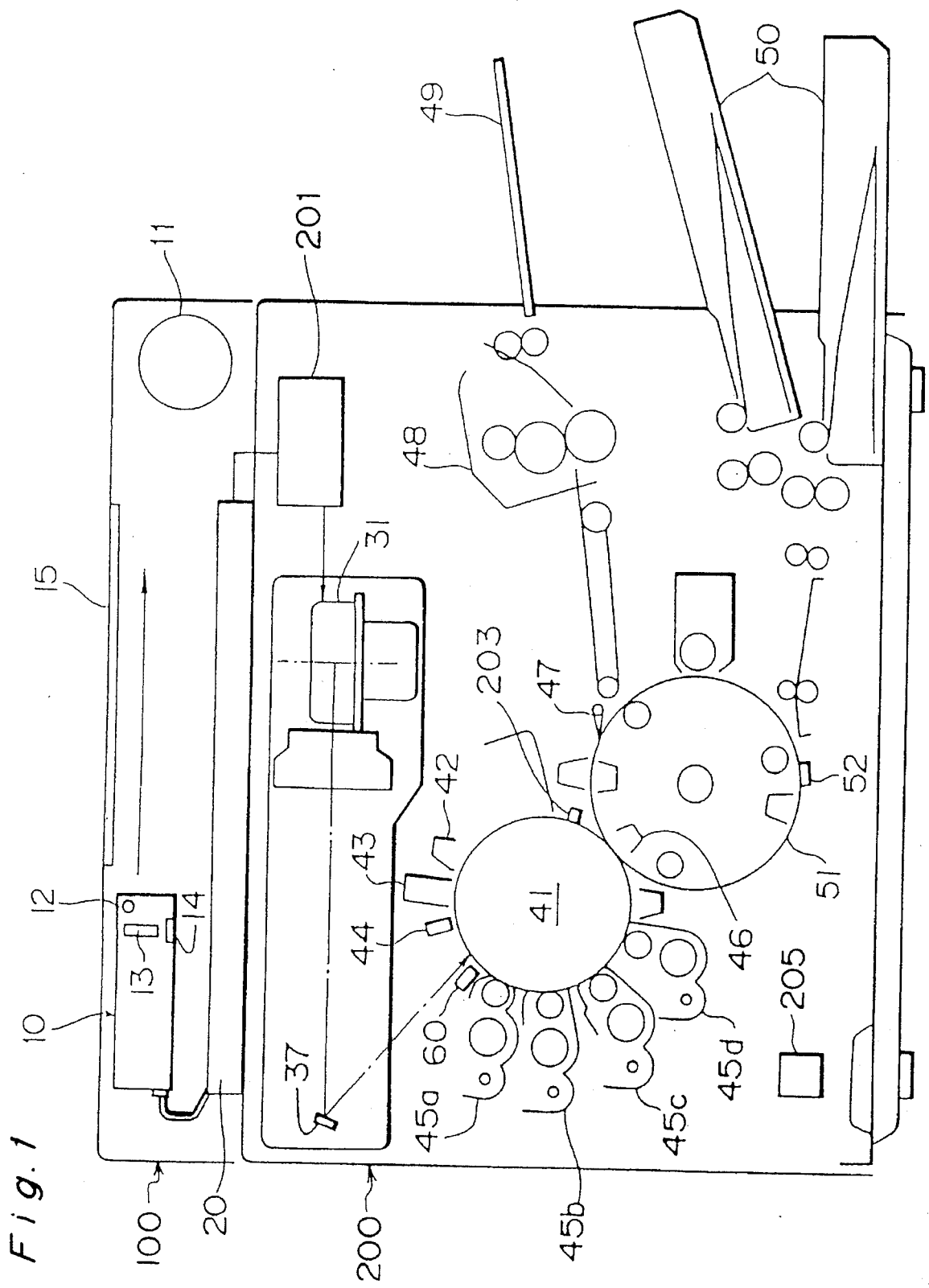
FIG. 1 is a sectional view of a digital color copying machine.

Referring now to the drawings, wherein like reference characters designate like or corresponding parts throughout the several views, an embodiment of the present invention will be explained below.

(A) Structure of digital color copying machine

FIG. 1 shows a schematic entire structure of a digital color copying machine which consists mainly of an image reader section 100 for reading a document image and a printer section 200 for reproducing the document image.

In the image reader section 100, a scanner includes an exposure lamp 12 for exposing a document put on a platen 15, a rod lens array 13 to collect reflection light from the document and a contact type CCD sensor 14 to convert the collected light to an electric signal. The scanner 10 is driven by a motor 11 to move in the direction (subscan direction) of the arrow shown in FIG. 1.

The optical image of a document illuminated by the exposure lamp 12 is converted by the CCD sensor 14 into multi-level electric signals of red (R), green (G) and blue (B). The electric signals of the three colors are converted by an image signal processor 20 to 8-bit data of yellow (Y), magenta (M), cyan (C) or black (K) and ps to the printer controller 201.

Figure 3:
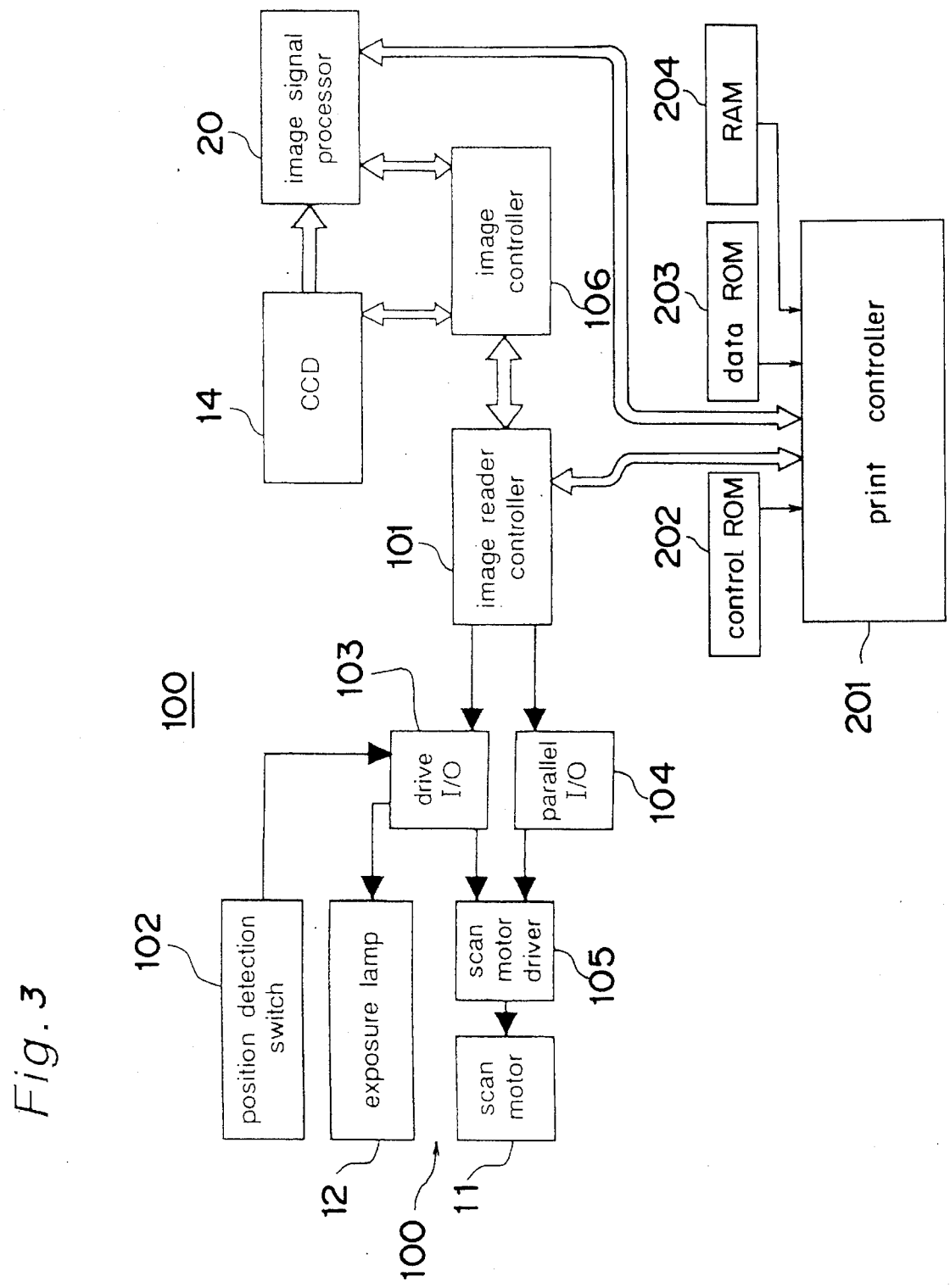
FIG. 3 is a part of a block diagram of a printer controller.

The image reader section 100 is controlled by an image reader controller 101, as shown in FIG. 3. The controller 101 controls the exposure lamp 12 via a drive I/O 103, according to a position signal of a position detection switch 102 which detects the document at a position for turning on the lamp 12. The controller 101 also controls the scan motor driver 105 via the drive I/O 103 and a parallel I/O 104. The scan motor 11 is driven by the scan motor driver 105. The image reader controller 101 is also connected to an image controller 106 which is connected to the CCD sensor 14 and to the image signal processor 20. The CCD sensor 14 and the image signal processor 20 are connected to the image controller 106 which in turn is connected to the image reader controller 101.

Figure 2:
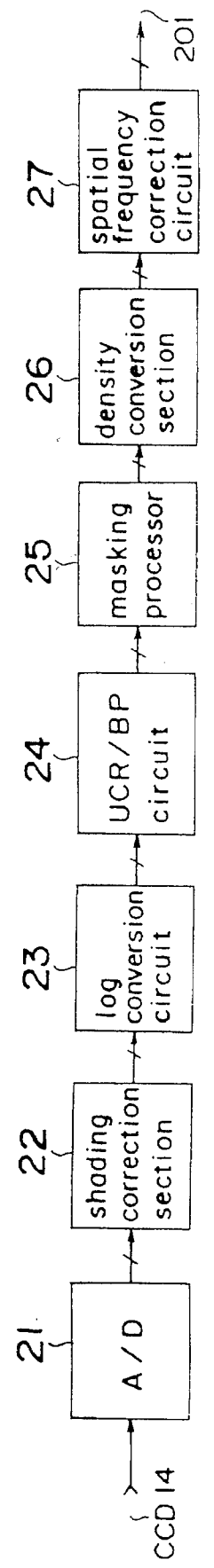
FIG. 2 is a block diagram of an image signal processor.

As shown in FIG. 2, in the image signal processor 20, the image signal obtained by the photoelectric conversion with the CCD sensor 14 is converted to multi-level digital image data of R, G and B by an analog-to-digital converter 21. The converted image data is subjected to shading correction by a shading correction section 22, and then the image data is converted to density data according to logarithmic conversion by a log conversion circuit 23. Further, an excess black is removed from the R, G, B density data and a true black data K' is generated from the density data by an under color remove/black painting circuit 24. Then, the R, G, B density data are converted to data of cyan (C), magenta (M) and yellow (Y) by a masking processor 25. Then, the C, M, Y data are multiplied with correction coefficients by a density conversion section 26 and further corrected by a spatial frequency correction circuit 27. The processed data are sent next to the printer controller 201 in the printer section 200.

In the printer section 200 shown in FIG. 1, a print head 31 performs the gamma correction of the gradation data and a dither processing if necessary, and it converts the corrected data to a digital drive signal to drive a laser diode 264 (FIG. 4) in the print head 31.

A laser beam emitted from the laser diode 264 at an intensity in correspondence to the gradation data exposes a photoconductor drum 41 under rotated, via a reflection mirror 37 as shown with a dot and dash line. Thus, a latent image of the document is formed on the photoconductor drum 41. The photoconductor drum 41 has been illuminated by an eraser lamp 42 and has been sensitized uniformly by a sensitizing charger 43 for each copy before the exposure. When the exposure is performed onto the photoconductor in the uniformly charged state, an electrostatic latent image is formed on the photoconductor drum 41. Then, one of development units 45a–45d, which provide development materials including yellow, magenta, cyan or black toners and carriers, is selected to develop the latent image on the photoconductor drum 41. On the other hand, a paper is supplied from a cassette 50 and is wound on a transfer drum 51. The developed image is transferred by a transfer charger 46 to a paper wound on a transfer drum 51.

Figure 4:
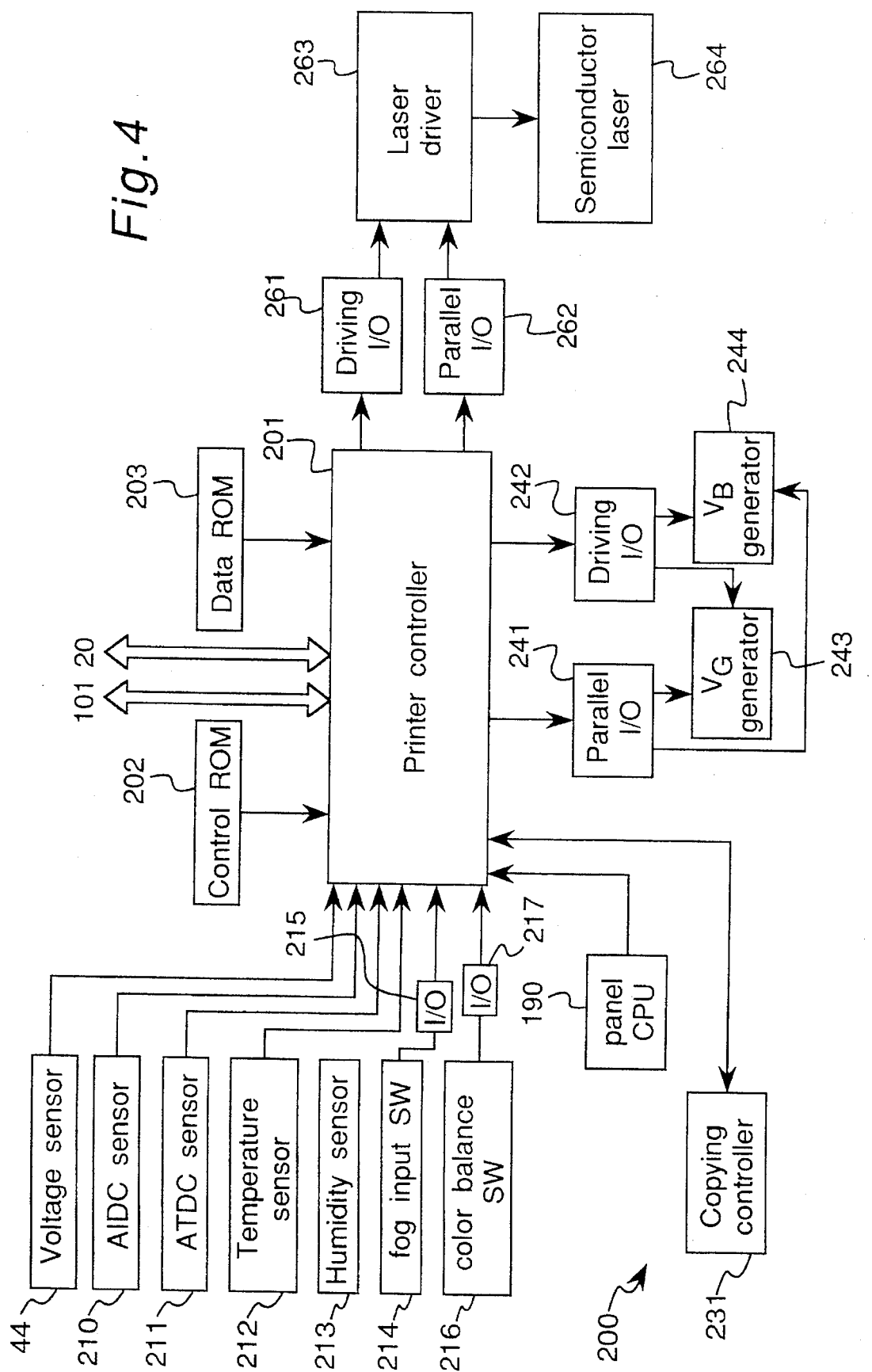
FIG. 4 is the other part of the block diagram of the printer controller.

The above-mentioned printing process is repeated four times for yellow, magenta, cyan and black. Then, the paper is separated from the transfer drum 51 with the operation of an separation claw 47, the image is fixed by a fixer 48 and the paper is carried out to a paper tray 49. (B) Printer controller and image signal processing FIGS. 3 and 4 show a block diagram of the control system of the digital color copying machine. The printer controller 201 included in the printer section 200 controls the print action. The printer controller 201 including a CPU is connected to a control ROM 202 storing a control program, a data ROM 203 storing various data including gamma correction tables, and a random access memory (RAM) 204.

The printer controller 201 receives analog signals from a $V_O$ sensor 44, an AIDC sensor 210, an ATDC sensor 211, a temperature sensor 212 and a humidity sensor 213 as well as a color balance switch 216. The $V_0$ sensor 44 detects the potential of the surface of the photoconductor drum 41. The AIDC sensor 210 detects a toner amount on the photoconductor drum 41 formed in the standard image-forming conditions (the surface potential $V_0$, the development bias potential $V_B$ and the exposure light quantity) for each color in order to set optimum $V_0$, $V_B$ and the exposure light quantity. Various input data from a panel CPU 190 which controls an operational panel 221 explained later (FIG. 5) are received by the printer controller 201 via a parallel I/O 222. Similarly, input data with a tablet editor 232 (FIG. 11) are also received by the printer controller 201 via the panel CPU 190.

The printer controller 201 controls a copying controller 231 and a display panel 232 according to the data from the operational panel 221 and the data ROM 203. Further, it also controls high voltage units 243 and 244 for generating the grid voltage $V_G$ of the sensitizing charger 43 and for generating the development bias voltage $V_B$ of the development unit 45a–45d.

The printer controller 201 is also connected to the image signal processor 20 via an image data bus and performs gamma correction on the basis of the image signal received via the image data bus with reference to the data ROM 203. Then, the printer controller 201 control is the laser diode driver 263 via a drive I/O 261 and a parallel I/O 262, and the laser diode controller 220 controls the emitting of the laser diode 264. The gradation is expressed by modulating the light intensity of the laser beam emitted from the laser diode 264.

Figure 5:
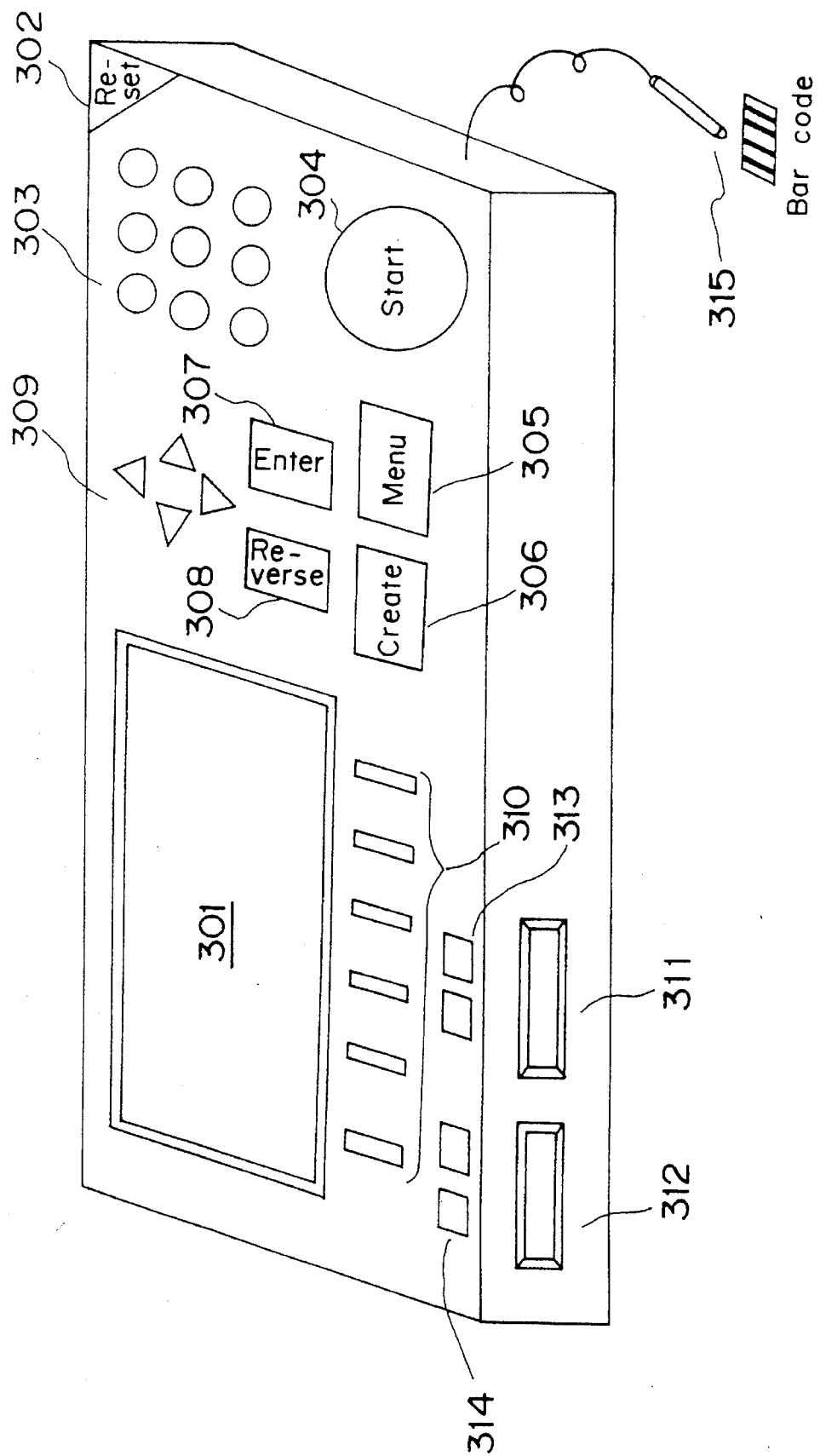
FIG. 5 is a perspective view of an operational panel.

FIG. 5 shows the operational panel 221, wherein a liquid crystal display 301 displays for example the mode designated by the operation with this panel 221, the explanation of the operating procedures for a user, the status such as jam or copy. A panel reset key 302 is provided for initializing all the modes. Keys 303 consist of ten-keys for setting the number of copies and a clear key for clearing the key-inputs. A start key 304 is provided for starting a copy operation. If an image quality menu key 305 is pressed, a menu for image quality control is displayed in the liquid crystal display 301, and a User can control the image quality by operating the menu. If a create menu key 306 is pressed, a menu for setting various create functions is shown in the image plane of the liquid crystal display 301, and a user can set various functions or modes by operating the menu. An enter key 307 is used as a determination key or a next image plane key in the above-mentioned various menus. A reverse key 308 is used as a cancel key or a preceding image plane key in the manus. Cursor keys 309 are used for selecting various settings on the image planes. Multi-function keys 310 have different meanings in each selection menu shown in the liquid crystal display 301. The operational panel 221 has two inlets 311 and 312 for inserting two IC cards at maximum, and a key 313 for program call/register and a key 314 for IC card discharge are provided for each inlet. Further, a pen 315 is provided to read a bar code to set various modes.

Figure 6:
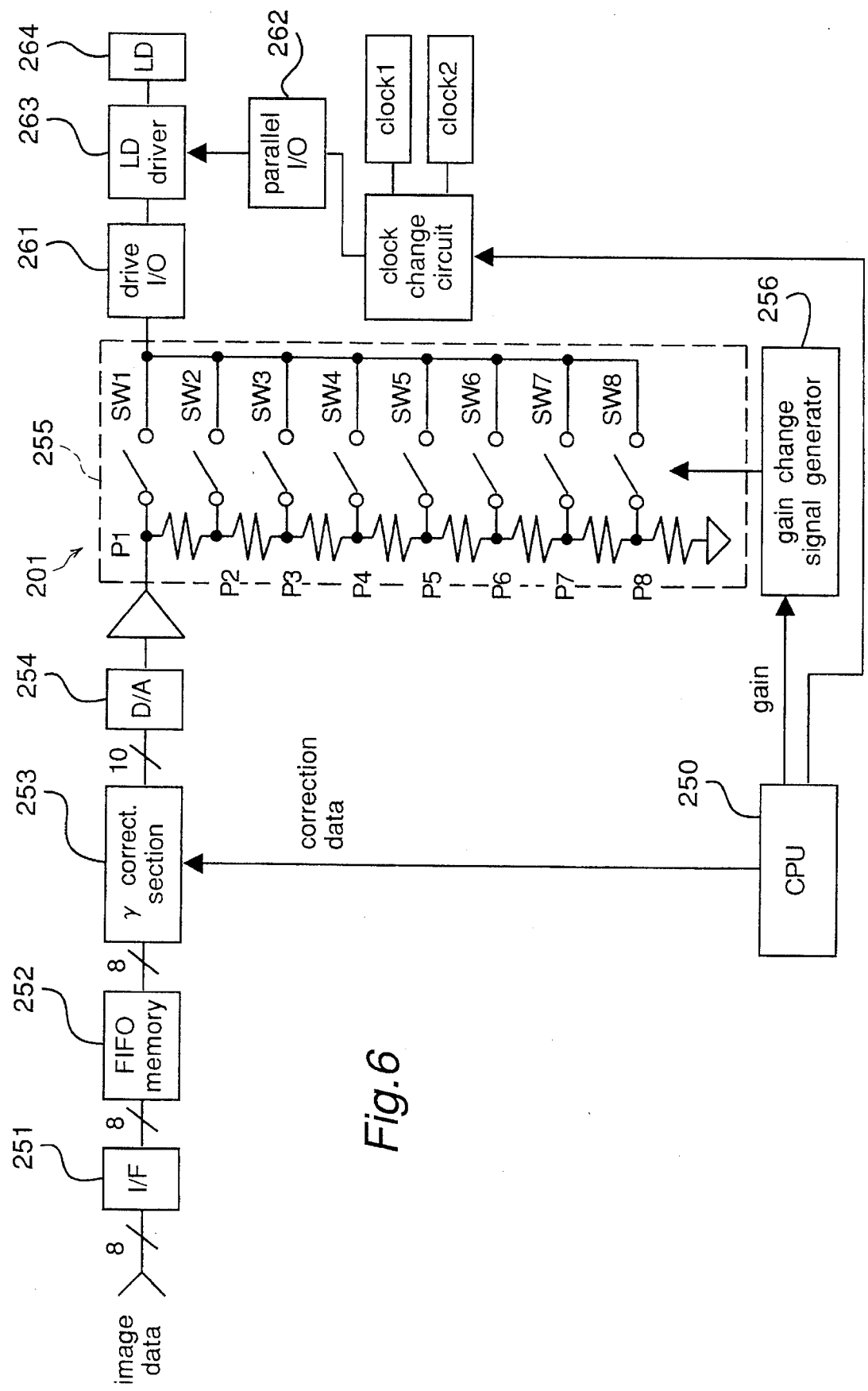
FIG. 6 is a block diagram of the image data processing in the printer controller.

FIG. 6 shows image data processing in the printer controller 201. Multi-level (8-bit) image data received from the image signal processor 20 are received through an interface 251 and are stored in a first-in first-out (FIFO) memory 252. The FIFO memory 252 is a line buffer memory which can store gradation data of a prescribed line number in the main scan direction and it buffers the difference of the clock frequencies between the image reader section 100 and the printer section 200. The data in the FIFO memory 252 are inputted to a gamma correction section 253. Gamma correction data in the data ROM 203 (FIG. 4), which stores various gamma correction data, are sent to the gamma correction section 253 by the CPU 250, and the gamma correction section 253 corrects the input data to send a corrected output level to a D/A converter 254. The D/A converter 254 converts the digital input data to an analog voltage, which is next amplified by an amplifier 255 with a gain for a gain signal generator 256 by the CPU 250 and is sent through a drive I/O 261 to a laser diode (LD) driver 263. The driver 263 drives the laser diode 264 to emit a light of an intensity in correspondence to the digital image data.

On the other hand, the CPU 250 sends a signal to a clock change circuit 257 to select a clock generator 258 or 259, and the generated clock signals are sent via a parallel I/O 262 to the laser diode driver 263 to modulate the image data with the clock signals. By selecting the clock generators 258, 259, a duty ratio (for example 100% and 80%) of the light emitting signals can be changed.

(C) Image stabilization

The gradation characteristic is determined basically by the sensitivity characteristic of the photoconductor, the development characteristic, and the setting values of the sensitizing potential $V_0$, the development bias voltage $V_B$ and the decay potential $V_S$ of the electrostatic latent image. In the image reproduction especially of a color image, the output image is required to be proportional to the document density, and the image stabilization is performed according to this requirement. Besides this standard gradation characteristic, in the present invention, a user can select a desired gradation characteristic, and the gradation control system is operated in combination with the image stabilization system, to stabilize always the selected gradation characteristic.

Figure 7:
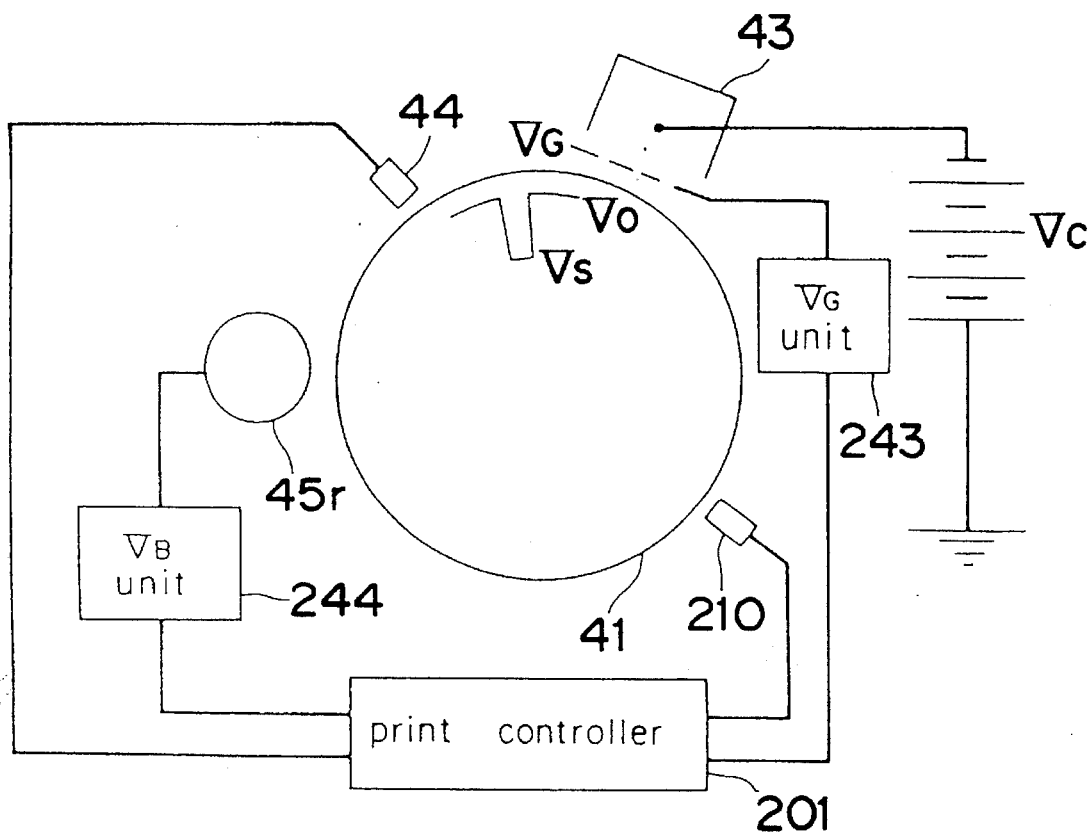
FIG. 7 is a schematic diagram of the arrangement of a sensitizing charger and a development unit around a photoconductor.

Before explaining the image stabilization, the electrophotographic process is explained with reference to FIG. 7 of a schematic diagram of image forming section including a photoconductor drum 41 and a roller of a development unit 45r. A sensitizing charger 43 of grid voltage $V_G$ (discharge voltage $V_C$) is arranged opposite to the photoconductor 41. The negative grid voltage $V_G$ is applied to the grid of the charger 43 by a grid voltage generator 243. The surface potential $V_o$ of the photoconductor just after the sensitization before the exposure can be taken almost equal to the grid voltage $V_G$. Therefore, the surface potential $V_o$ can be controlled by the grid voltage $V_G$. The surface potential $V_o$ is detected with the $V_o$ sensor 44 which is an electrometer.

First, before the exposure of laser beam, a negative surface potential $V_o$ is applied to the photoconductor drum 41 by the sensitizing charger 43, while a negative, lower bias voltage $V_B(|V_B|<|V_o|)$ is applied to the roller of the development unit 45r by a development bias voltage generator 244. That is, the voltage of the development sleeve is $V_B$.

A laser beam exposes the photoconductor, and the potential at the exposure position decreases from the surface potential $V_o$ to an attenuation potential $V_I$ of the electrostatic latent image or the surface potential just after the laser exposure. If the attenuation potential $V_I$ becomes lower than the development bias voltage $V_B$, toners carried to the surface of the sleeve of the development unit 45r adhere to the photoconductor drum 41.

It is not good that the difference between the surface potential $V_o$ and the development bias voltage $V_B$ is too large or too small. Further, the amount of adhered toners increases with increasing the development voltage $\Delta V = |V_B - V_I|$. On the other hand, the attenuation potential $V_I$ changes with the surface potential $V_o$ even at the same quantity of exposure light. Then, for example, the surface potential $V_o$ and the development bias voltage $V_B$ are changed by keeping the difference between the surface potential $V_o$ and the development bias voltage $V_B$ constant. Then, the difference between the development bias voltage $V_B$ and the attenuation potential $V_I$ changes or the amount of adhered toners can be changed to control the density (for example Japanese patent laid open Publication No. 271,764/ 1991). Further, the gain of laser emission can be changed according to the photoconductor sensitivity information obtained with the $V_o$ sensor 44.

The electrophotographic process is affected by the environment because it deals with electrostatic charges, and the development characteristic and the photoconductor characteristic mainly change according to the environment. In order to compensate such changes to keep the maximum density level constant, for each of the four colors, a standard toner image is formed by developing an electrostatic latent image formed in the standard image-forming conditions, and the amount of toners adhered to the standard toner image is detected with the AIDC sensor 210. Then, the development bias voltage $V_B$ and the grid potential $V_G$ are changed according to the detected value to select the development voltage ($\Delta V$) in order to keep the maximum density level constant. This is called as automatic image density control (AIDC). Further, it is also needed to remove a fog.

(D) Standard gradation characteristic

Figure 8:
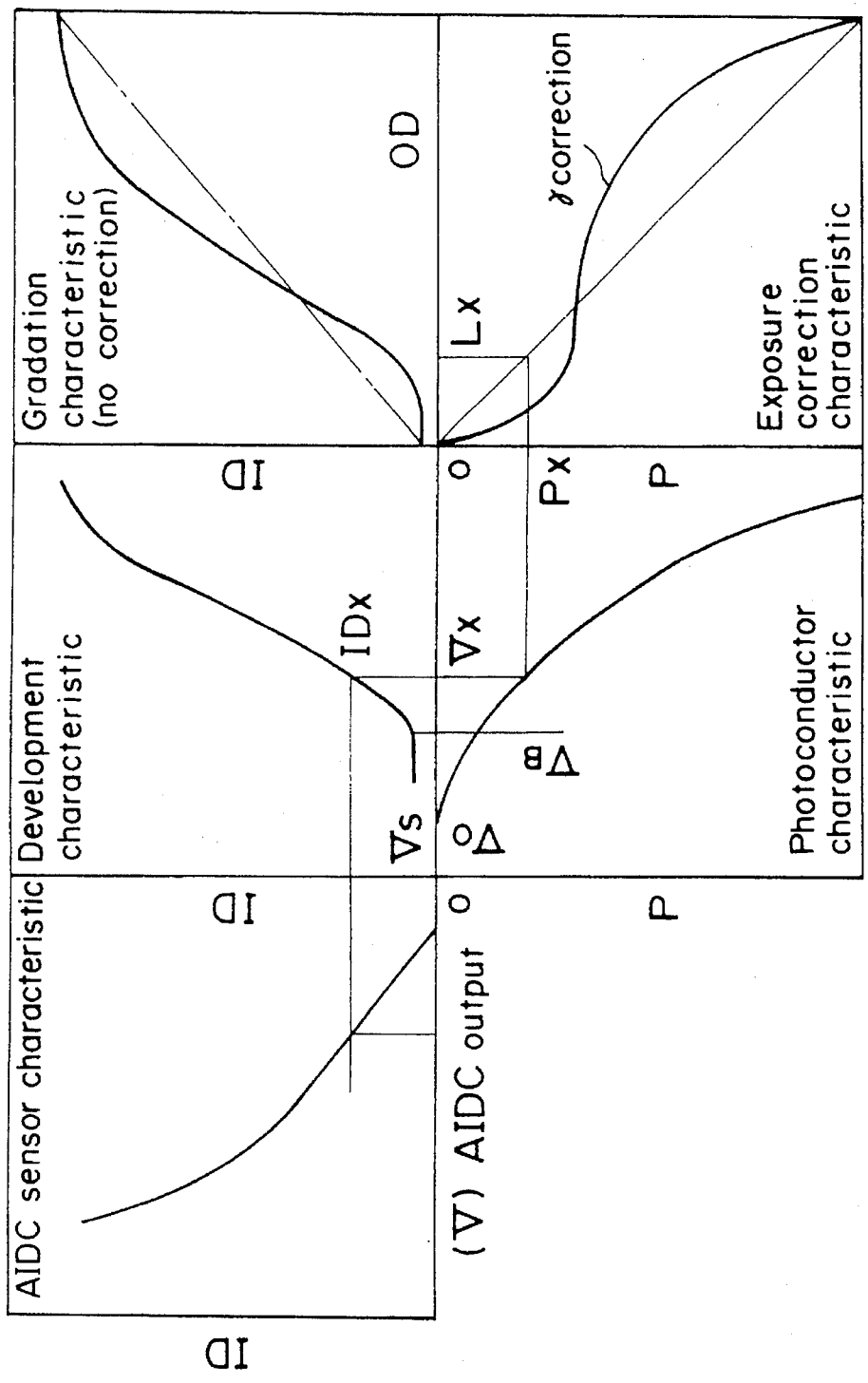
FIG. 8 is a graph of the sensitometry in inversion development.

Next, linear gradation correction is explained as a standard. Especially for a color image, the linear characteristic is needed basically as a standard. FIG. 8 shows a diagram of sensitometry in the inverted development system. A value of image signal (image input level OD) inputted from the image reader section 100 is linear against the document density. If the laser light quantity P(Lx) is changed linearly against the image input level Lx, the gradation characteristic or a relation of output image density (ID) of the image printed actually changes nonlinearly against the output image density (ID). The surface potential $V_S$ of the photoconductor decays with the laser emission, or the surface potential decays nonlinearly gradually with increasing laser light quantity. Further, the development bias voltage $V_B$ is determined against the sensitizing potential $V_o$ to remove a fog, and the output image density ID($V_s$) is obtained for the development potential difference ($V_B-V_s$(Lx)). This development characteristic also has nonlinearity. Then, as will be explained later, the laser light quantity P(Lx) is changed not linearly, but nonlinearly against the image input level Lx in order to realize the linear characteristic wherein the output image density is linear against the input level.

Figure 9:
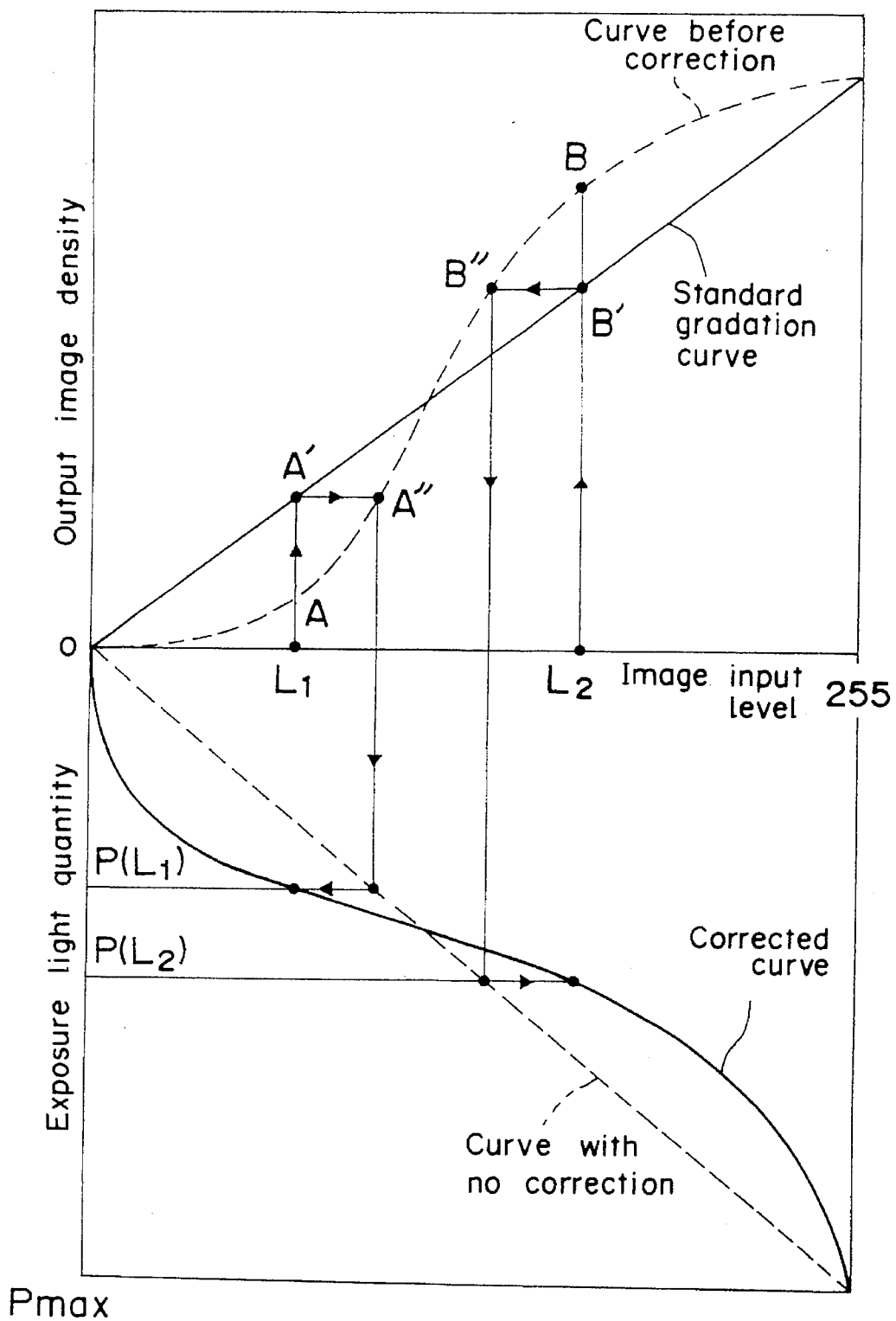
FIG. 9 is a diagram for obtaining standard gradation correction data.
Figure 10A:
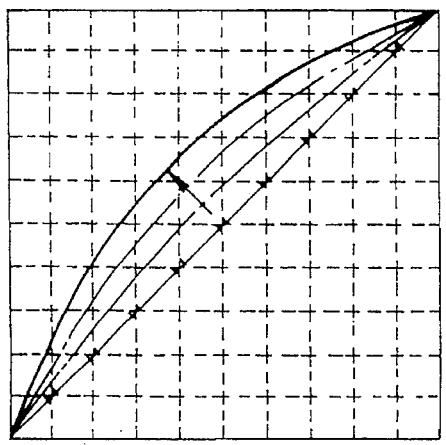
FIGS. 10(*a*), (*b*), (*c*) and (*d*) are schematic diagrams of the shapes of gradation curves and of the degrees of emphasis of the shapes.
Figure 10C:
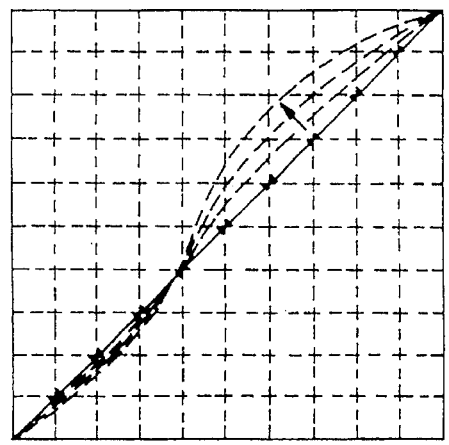
Figure 10B:
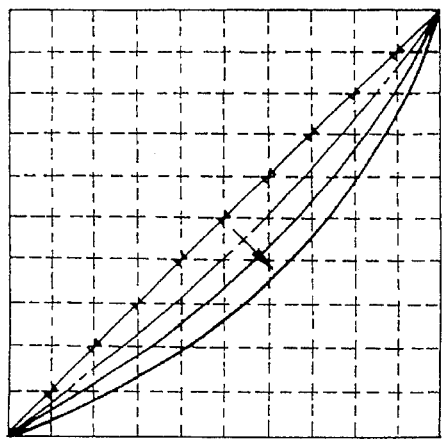
Figure 10D:
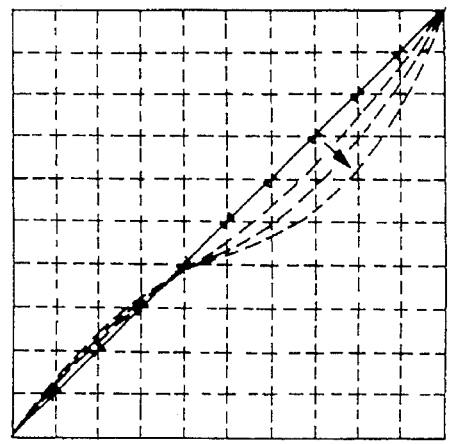

FIG. 9 illustrates how to determine the gradation correction data to realize the linear relation of the output image density to the input level or the standard gradation characteristic. If the image input data is converted linearly to the laser exposure quantity to expose the photoconductor, as shown in the lower half of FIG. 9, the gradation curve becomes nonlinear as shown as a dashed line in the upper half of FIG. 9. The light-emission characteristic for realizing the object standard gradation characteristic displayed as a dashed line is displayed as a solid curve in the lower half of FIG. 9. That is, when a point A on the dashed line (image input level $L_1$) is converted to a point A' on the solid line, the laser exposure quantity P($L_1$) at a point A" on the dashed line having the same output as the point A' is ps for the input image data $L_1$. Similarly, when a point B on the dashed line (image input level $L_2$) is converted to a point B' on the solid line, the laser exposure quantity P($L_2$) at a point B" on the dashed line having the same output as the point B' is ps for the input image data $L_2$. Thus, the laser exposure amount for an image input level, that is, gradation correction data can be obtained as a solid curve in the lower part of FIG. 9.

(E) Gradation selection

It is explained above how to realize the standard gradation characteristic for an output image which is fidel to the document image. In the present invention, a user can select different gradation curves from the standard one.

In the selection of gradation characteristic, the type of the shape of gradation curve and the degree of the change of the shape of the gradation curve from the standard gradation curve are selected in two steps, for the convenience of a user.

FIGS. 10(*a*), (*b*), (*c*) and (*d*) shows schematically a concept of the types of the shapes of gradation curve and the degree of the change of the shape of gradation curve from the standard gradation curve. There are available four types of the shape of gradation curve as to the relative change to the standard gradation curve. Further, by changing the step (level) of the change of the shape of the selected type of gradation curve, an infinite number of gradation curves can be realized.

In the low-density emphasis type (a), the gradation curve is convex upward. This gradation curve gives a heavy image.

In the high-density emphasis type (b), the gradation curve is convex downward. This gradation curve gives an image like a pastel picture. Further, an image dark as a whole can be corrected.

In the intermediate density emphasis type (c), the gradation curve is convex upward largely at high levels while convex downward a little at low levels. This gradation curve gives a colorful image or a sharp image.

In the intermediate density non-emphasis type (d), the gradation curve is convex downward largely at high levels while convex upward a little at low levels. This gradation curve gives a soft image or a smooth image.

A point of a gradation curve of the intermediate density emphasis or non-emphasis type (c), (d) with the straight line can be determined as the same point as the intersection with the linear line (FIG. 9).

Next, the selection of gradation curve is explained concretely. First, the selection with use of the operational panel 221 shown in FIG. 5 is explained. In this case, the type of the shape of gradation curve is first selected, and the degree of the change of the selected type of gradation curve from the standard gradation curve is selected next.

Figure 12:
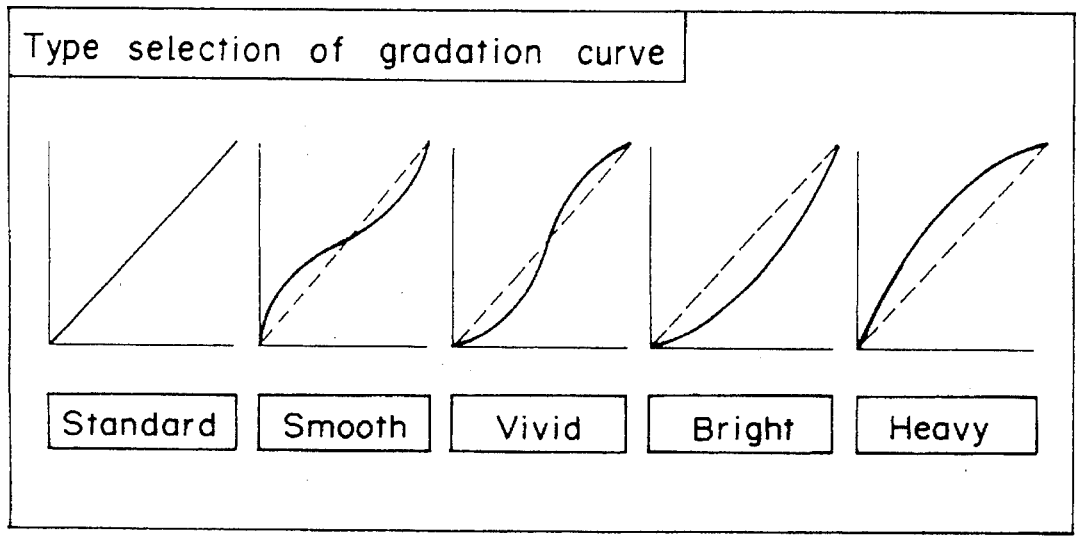
FIG. 12 is a diagram of an image for selecting the type of gradation curves.
Figure 13:
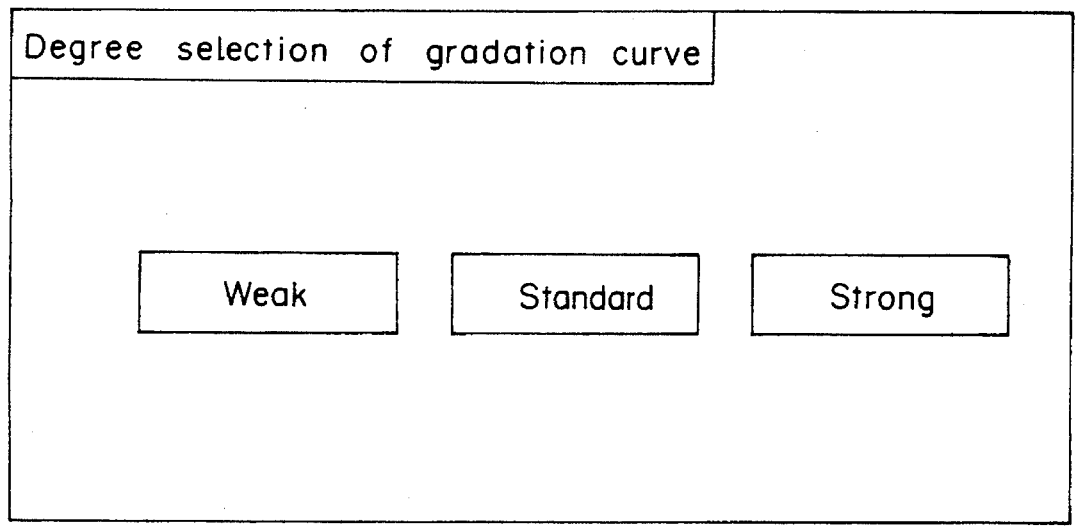
FIG. 13 is a diagram of an image for selecting the level of gradation curves.

First, by pressing the key 306, an image for selecting the type of gradation curve is displayed on the screen of the display 301. FIG. 12 shows a selection image displayed on the screen. In the selection image, the gradation curves shown in FIGS. 10(*a*)–(*d*) as well as the standard gradation curve are displayed each with a word for representing a characteristic of the gradation curve such as "Standard", "Smooth", "Vivid", "Bright" or "Heavy". A desired type of the gradation curve among the five is selected with the keys 310 provided below the display 301. When a gradation curve is selected with the keys 310, words such as "Strong", "Standard" and "Weak", for representing the degree of the change of the gradation curve from the standard one are represented in the liquid crystal display 301. A user can select one of them with the keys 310 to set the degree of the change. That is, the gradation curve can be selected in the three levels of the change. If the "Strong" is selected, a gradation curve far from the standard one is selected in the three gradation curves of the selected type of gradation curve. If the "Weak" is selected, a gradation curve near the standard one is selected in the three gradation curves. If the "Standard" is selected, an intermediate gradation curve is selected in the three gradation curves.

In the above-mentioned selection, after the selecting the type of the gradation curve, an input of the level of the change of the gradation curve is urged in the display. If the level is not inputted, the level "0" or the standard object curve is selected.

Figure 11:
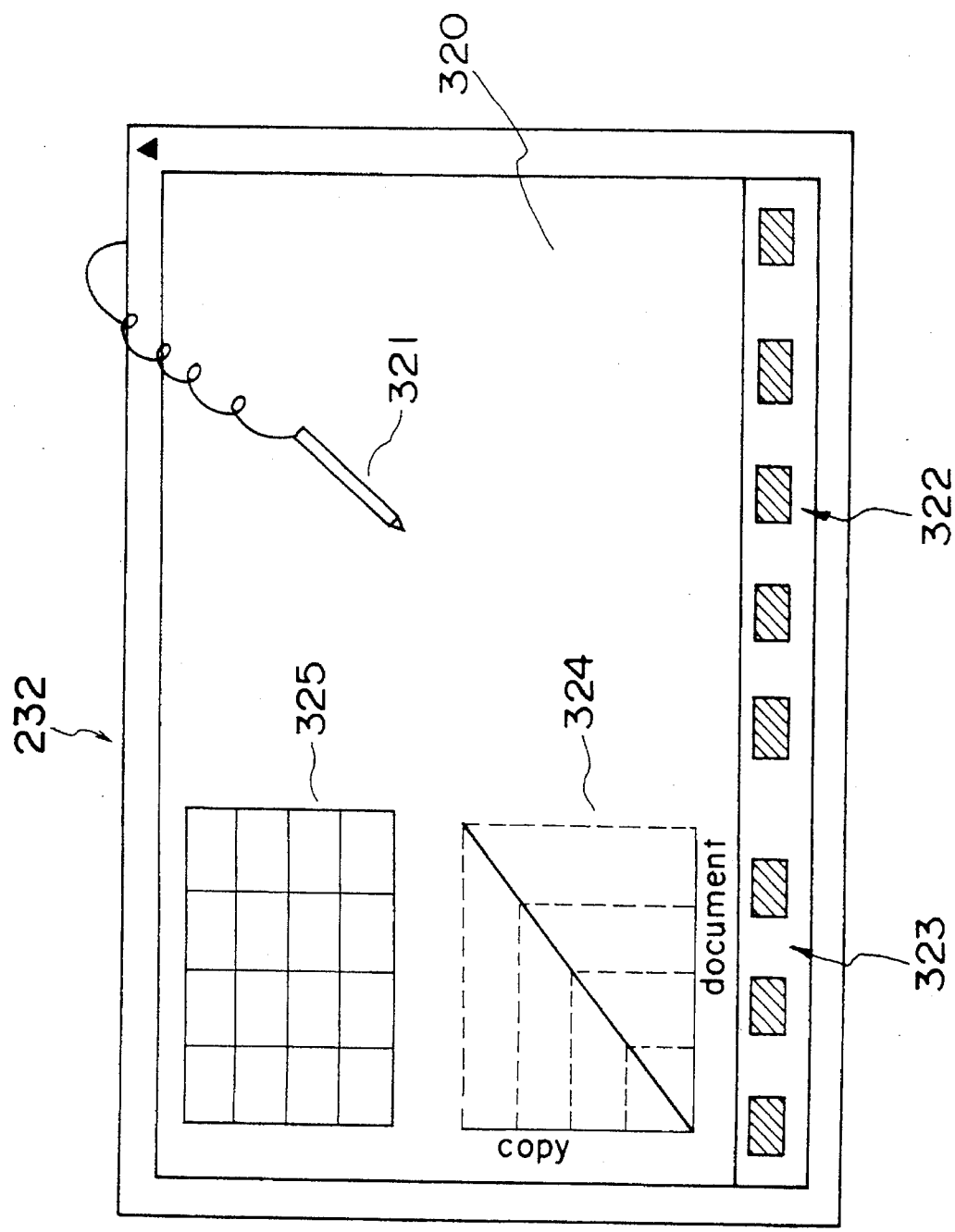
FIG. 11 is a diagram of a tablet editor.

Further, the gradation curve can also be selected with a tablet editor 232 shown in FIG. 11. In a coordinate input section 320 of the tablet editor 232, a pen 321 is used to designate a position on the document, and a partial edition among various edition functions can be conducted. The coordinate input section 320 also has key groups 322 and 323 of five and three keys for setting modes. That is, the mode keys 322, 323, gradation curve selection section 324 and a color pallet 325 are printed in the coordinate input section 320, and the coordinate input section 320 can be used as a mode set section or a level set section.

The mode keys 322 and 323 are used to set various modes, and a mode can be set by pressing with the pen 321. Therefore, the type and the degree of the change of the gradation curve can be selected with the keys 322 and 323.

(F) Other methods of gradation selection

In the above-mentioned method for selecting a gradation curve, the type of the shape of gradation curve and the degree of the change of the shape of gradation curves included in the type are designated successively. However, the selection of a gradation curve is not easy for a user, and it is desirable to make the selection easier for a user. Various other kinds of selection methods of gradation curve will be explained below.

Figure 14:
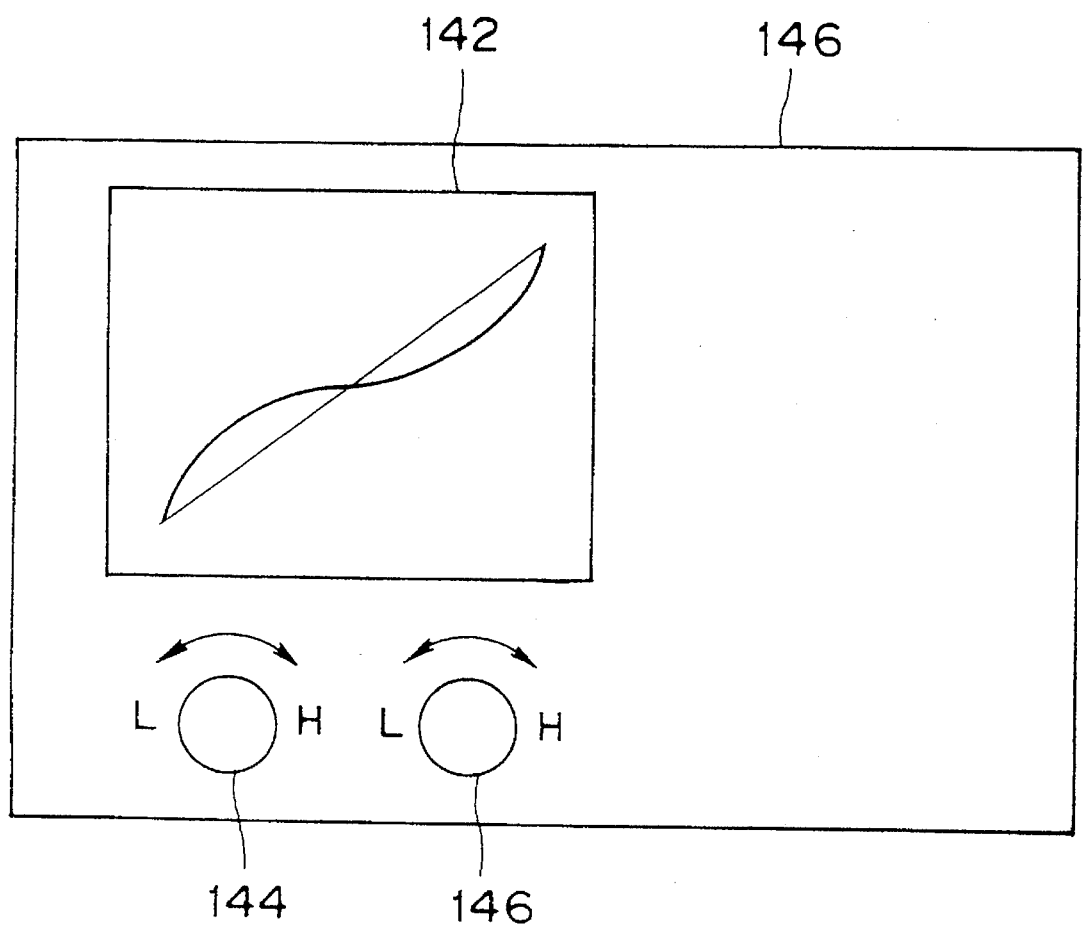
FIG. 14 is a plan view of another tablet editor for setting a gradation curve by using dials for high and low densities.

In an example illustrated in FIG. 14, the shape of gradation curve can be changed both at the high density side (H) and at the low density side (L). A user can imagine easily levels such as the high density level and the low density level. Then, the gradation characteristic can be easily selected by a user by controlling the high and low density levels.

Figure 15:
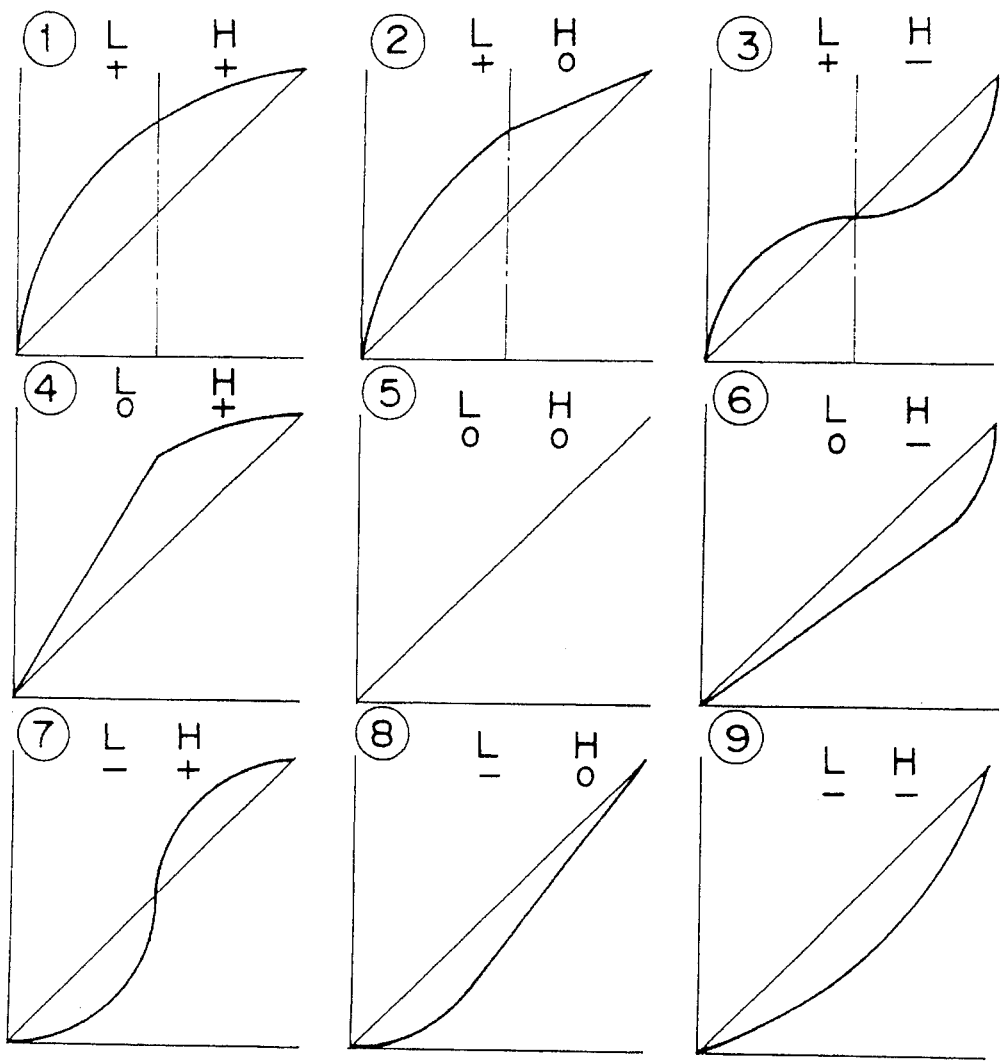
FIG. 15 is graphs of nine curves which can be set with the tablet editor shown in FIG. 14.

In FIG. 14, a tablet 140 is used instead of the tablet editor 232 shown in FIG. 11. In the tablet 140, dials 144 and 146 in correspondence to the high density (H) and at the low density (L) are provided below a liquid crystal panel 142 wherein a gradation curve is displayed. By setting the dials 144 and 146 each at one of three steps, +(H), 0 and−(L), a gradation curve is selected. FIG. 15 shows nine gradation curves each with an encircled number from 1 to 9 which can be set by the dial setting (refer Table 1).

TABLE 1

|   | L | H |
|---|---|---|
| 1 | + | + |
| 2 | + | 0 |
| 3 | + | − |
| 4 | 0 | + |
| 5 | 0 | 0 |
| 6 | 0 | − |
| 7 | − | + |
| 8 | − | 0 |
| 9 | − | − |

Figure 16:
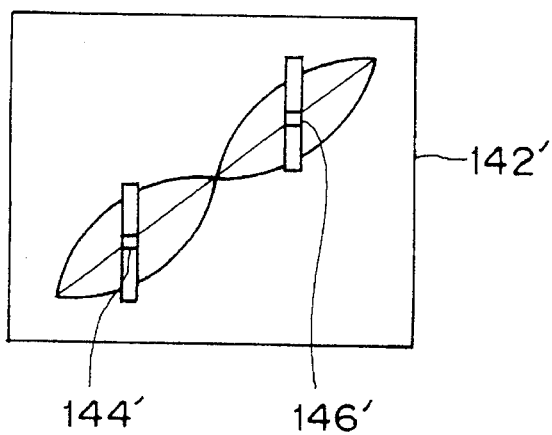
FIG. 16 is a plan view of a liquid crystal panel for setting the central point and the high and low density levels.

Similarly, as shown in FIG. 16, levers 144' and 146' may be provided instead of the dials 144 and 146. The steps (+, 0, −) at the high and low densities of gradation curve can be set by pushing the levers 144' and 146' up or down.

Figure 17:
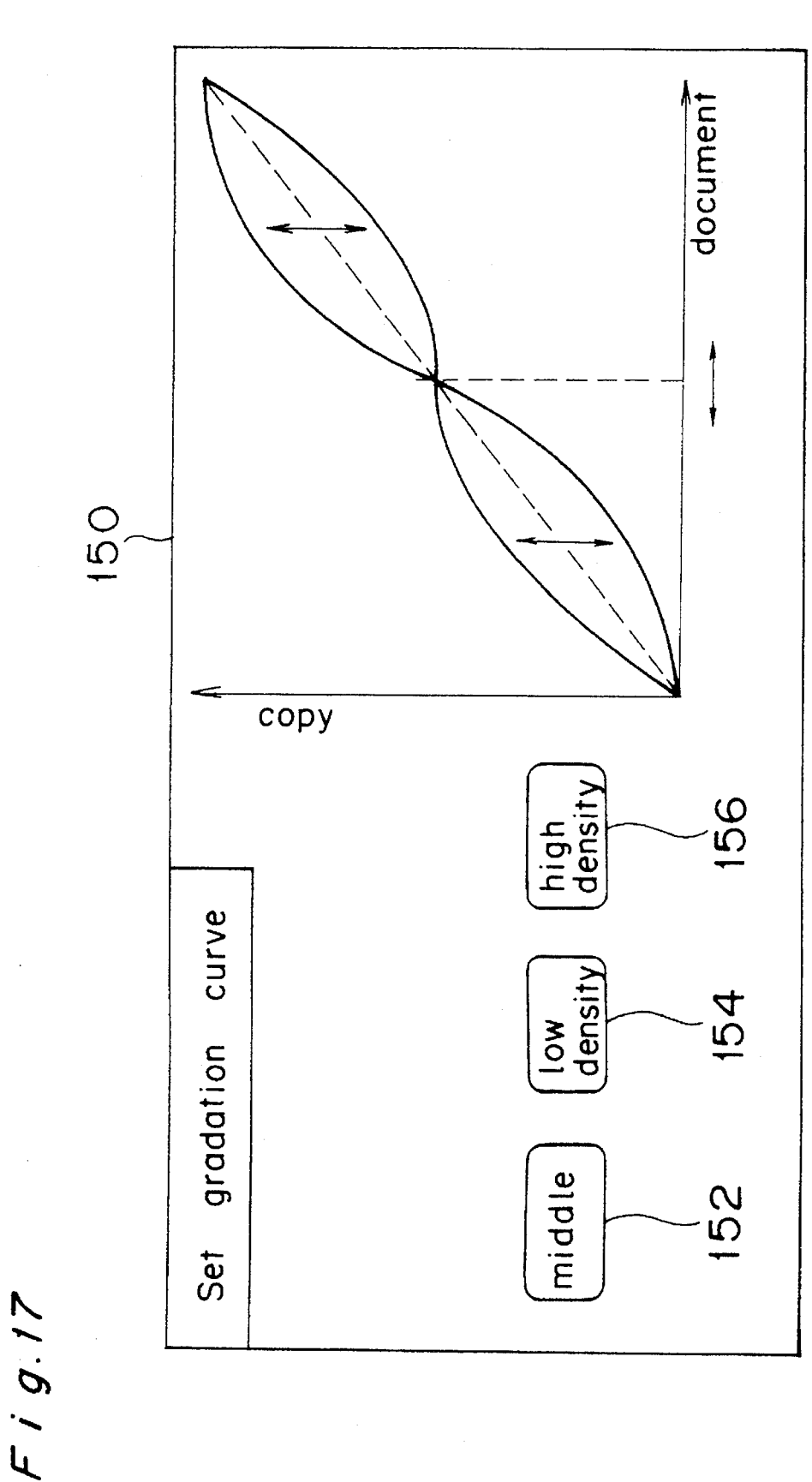
FIG. 17 is a plan view of a third tablet editor for setting a gradation curve by using dials for high and low densities.

FIG. 17 shows another tablet editor 150 wherein keys 152, 154 and 156 are provided to set the level at the middle, at the low density and at the high density. The middle key is used to move the middle point P, at which the gradation curve intersect the linear dashed line, in the right or left direction. The low and high density keys 154 and 156 are used to move the gradation curve upward or downward in the sides of lower density and of higher density than the middle point. In the low and high density regions, levels up to ±N including zero can be set wherein N denote a natural number.

Figure 18:
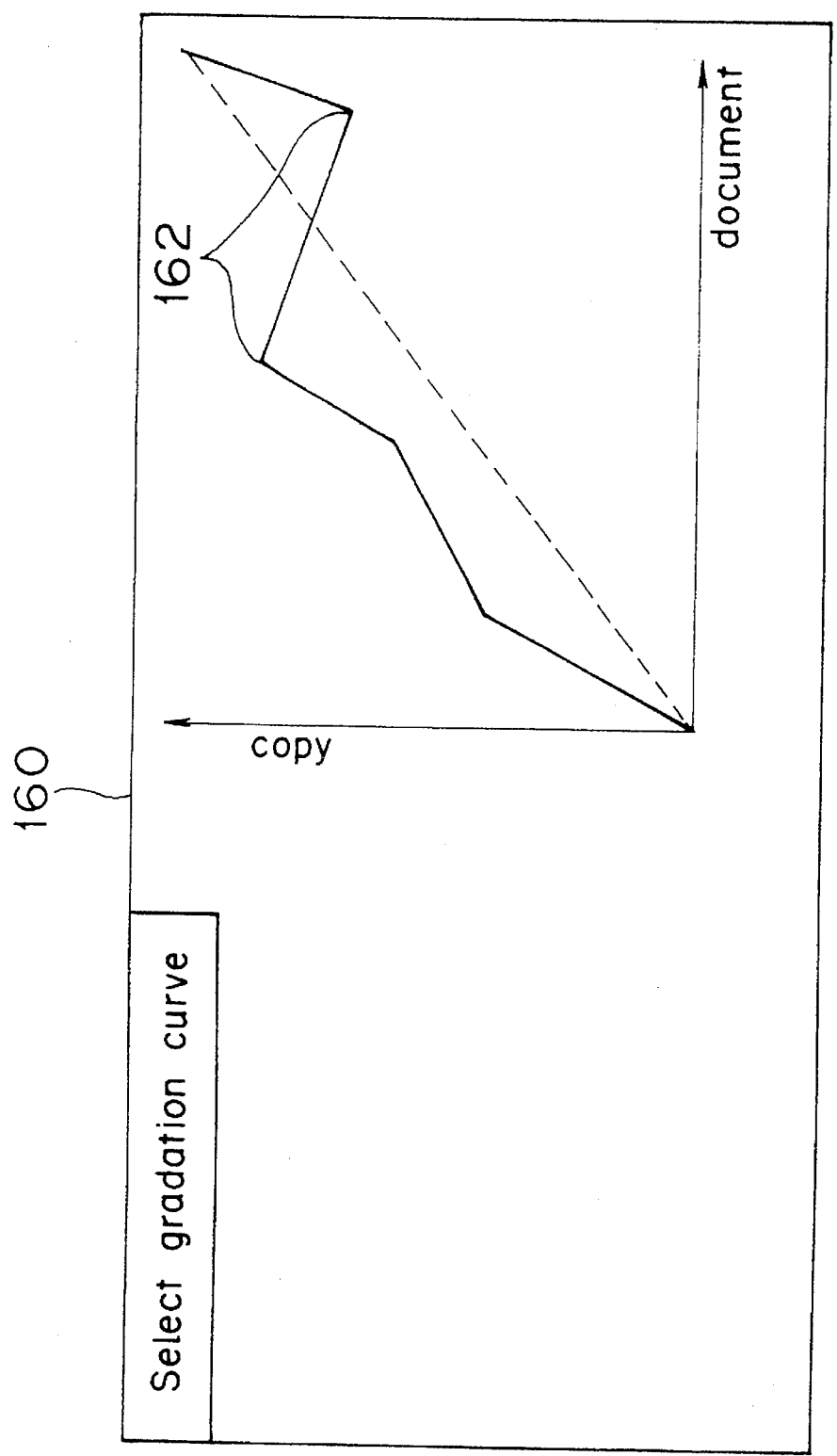
FIG. 18 is a plan view of another liquid crystal panel for setting a gradation curve with a pen.

FIG. 18 shows a third, tablet editor 160 wherein a gradation curve can be set flexibly by using a point pen (not shown) to point on a liquid crystal panel. That is, coordinates 162 of points can be set at any sites between the maximum document density and zero. In an example illustrated in FIG. 18, four points are set. A gradation curve is approximated as a linear line between neighboring points which may include an end point.

(G) Calculation of gradation correction data

In the present embodiment, the toner amount detected with the AIDC sensor 210 is classified at 28 levels, and the development bias potential $V_B$ and the surface potential $V_o$ (the grid potential $V_G$ of the =sensitizing charger 43) are determined according to the level determined with the AIDC sensor 210. Because the image-forming conditions are adjusted according to the level of the AIDC sensor 210, a gradation correction curve in correspondence with the level is needed for each image-forming conditions. If a gradation curve can be selected among a plurality of gradation curves, for example among 4×3=12 curves shown in FIGS. 10(a)-(d), it is needed to store gradation correction data of four colors Y, M, C and K and for 28 levels for each gradation correction curve. That is 13×28×4=1456 sets of gradation correction data are needed to be stored.

However, it needs a large capacity of memory to store all of such a large amount of gradation correction data even if piecewise linear approximation is adopted. Therefore, in the present embodiment, only a small number of basic gradation curves or original gradation curves are stored in a memory, and gradation correction data are calculated for the shape of a selected gradation curve. Thus, it is not needed to store all gradation correction data to decrease the memory capacity. If the piecewise linear approximation is adopted, the memory capacity can be decreased further.

Figure 20:
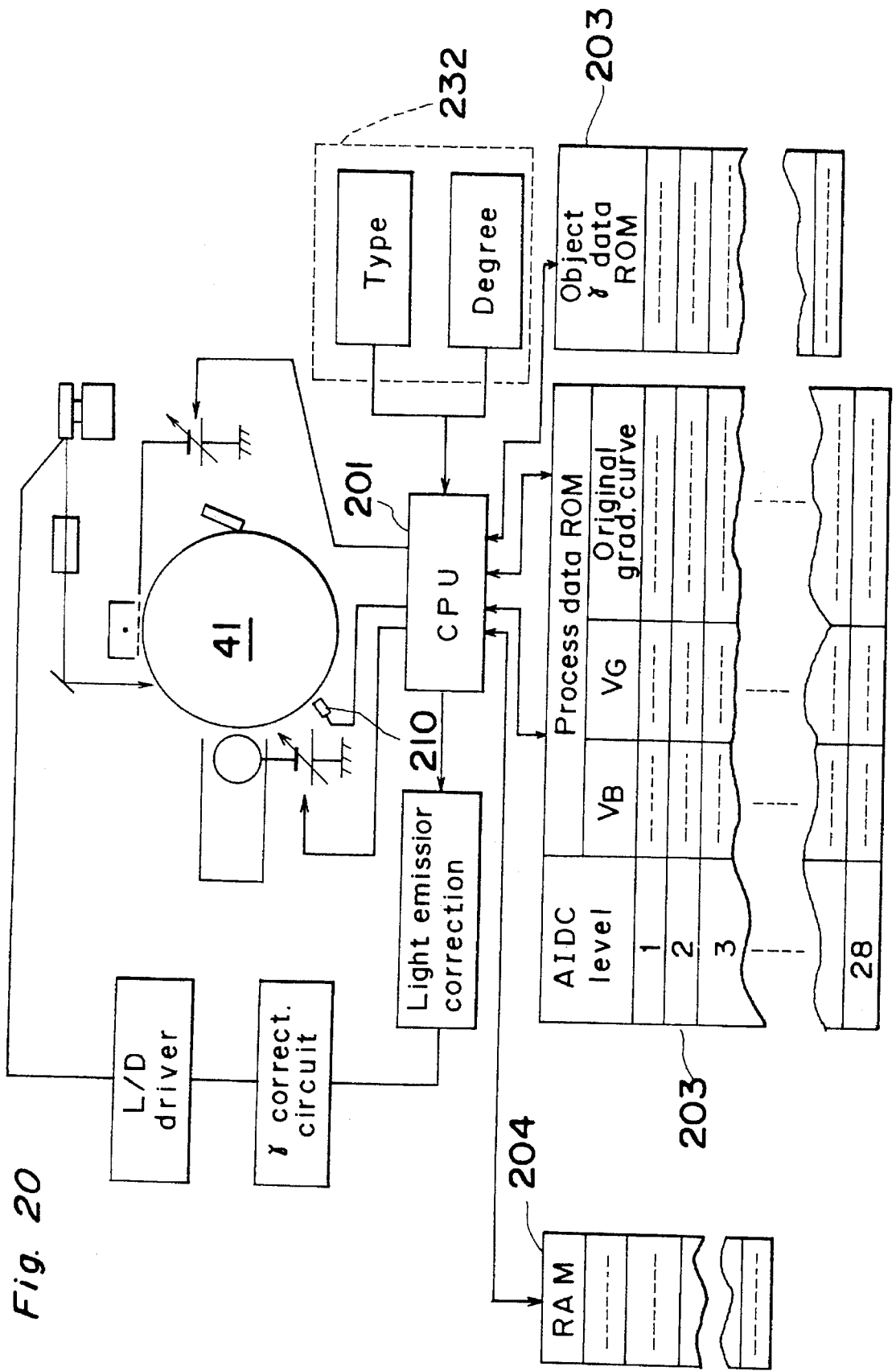
FIG. 20 is a diagram for illustrating the concept of the gradation control.

FIG. 20 shows a diagram for illustrating the concept of the gradation control of the present embodiment. The data ROM 203 stores the data of original gradation curves for each color of M, C, Y and K for each of 28 levels of the AIDC sensor 210. The gradation curves for converting the input image signal linearly to the light quantity data for exposing the photoconductor are adopted as the original curves for each level of the AIDC sensor 210. Further, the data ROM 203 stores the gradation curves of 4×3+1=13 kinds.

(A) First, a user sets a gradation curve with the operational panel 221. The setting may be performed with the tablet editor 23.

(B) On the other hand, an original gradation curve is read in correspondence to the detection level 1–28 of the AIDC sensor 210.

(C) Next, gradation correction data are calculated from the original gradation curve (B) and the gradation curve (A), similarly to the case of the standard gradation curve shown in FIG. 9.

Figure 19:
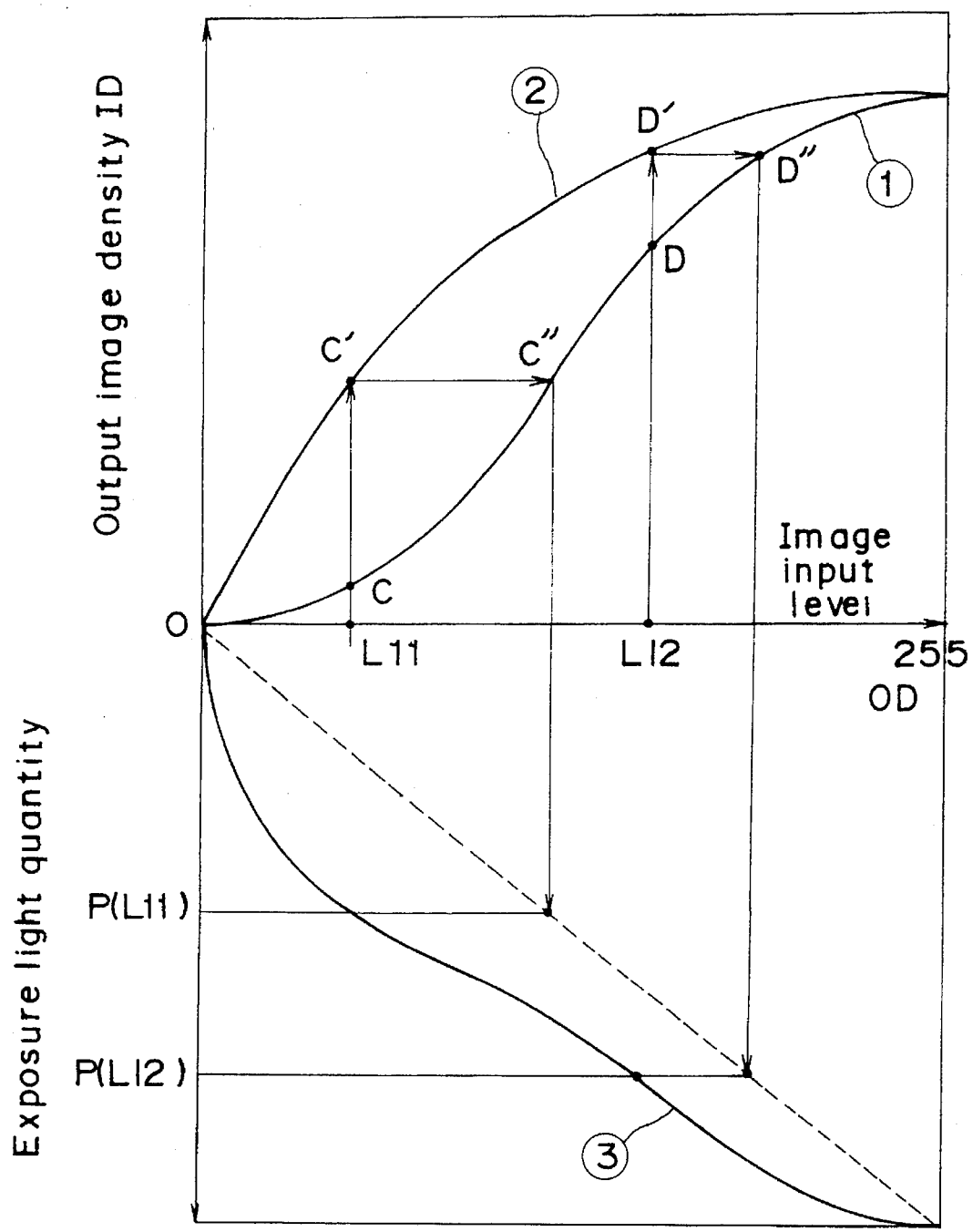
FIG. 19 is a graph for showing the procedures of calculating a gradation correction curve.

FIG. 19 shows a graph for showing how to calculate the gradation correction data. An original gradation curve at an AIDC level, denoted as 1 encircled, is nonlinear when the light quantity for exposure is linear for the input image level "OD" (a solid line shown in the lower part of FIG. 19), and it is read from the data ROM 203. On the other hand, a gradation curve set by a user with the operational panel 221 is denoted as 2 encircled. Next, the procedure of the calculation of the gradation correction data from the two curves "1" and "2" is explained.

If an input level L11 is given, it is needed to print at an image density denoted as C' for the gradation curve "2". A point on the original gradation curve "1" for reproducing the same image density as C' is C", and it is understood that the point C" can be reproduced if the light quantity for laser exposure is set as P(L11). Therefore, if the input level L11 is given, printing can be performed with the gradation characteristic shown as the gradation curve "2" by using P(L11). The data conversion is also performed at other image input levels similarly, and a gradation correction data "3" which shows a relation between the image input level and the light quantity for laser exposure can be calculated.

(D) The obtained gradation curve is stored in the RAM 204, and it can be used again if the same setting is selected.

In the example explained above, a gradation curve is set with use of the operational panel 221. However, it may also be set with the editor 232, 140, 150 or 160 similarly, and gradation correction data can be calculated similarly from the original gradation curve.

(H) Flow of printer control

Figure 21:
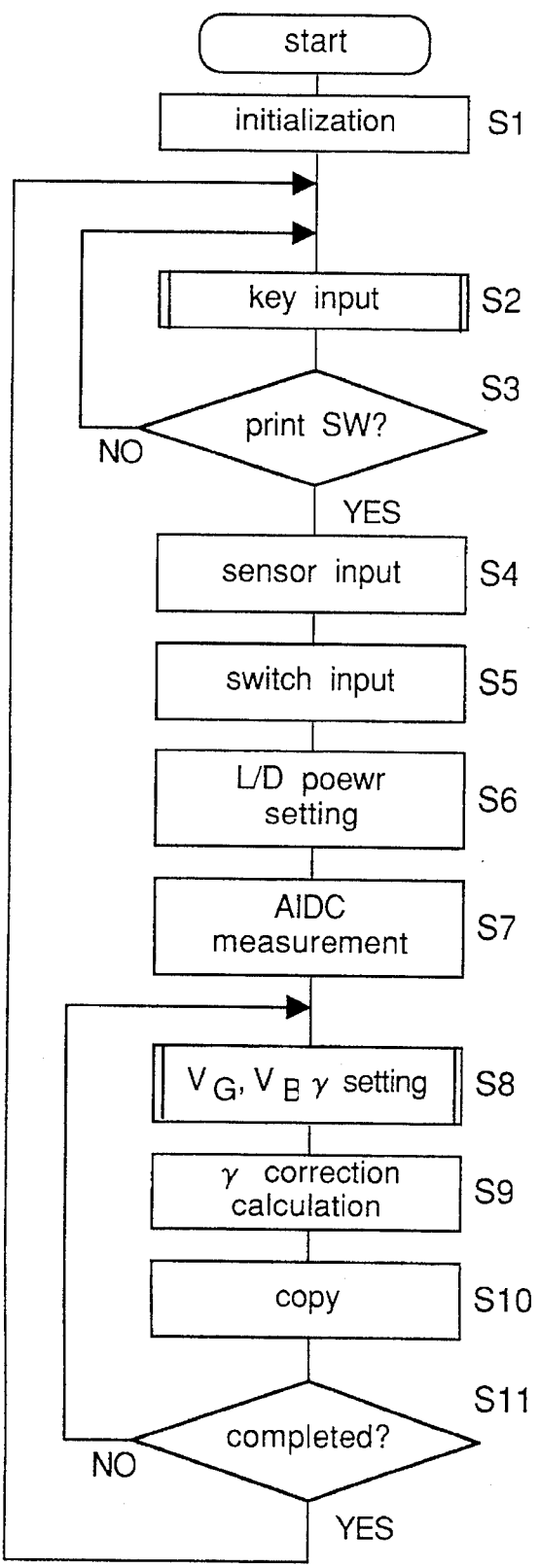
FIG. 21 is a chart of the main flow of the printer controller.

FIG. 21 shows a main flow of the printer controller 201. First at step S1, the initialization of the printer controller 201 is performed, and at step S2, the key-input processing of the operational panel 221 is performed (refer FIG. 22). Next, at step S3, the start key 304 in the operational panel 221 is waited to be pressed. If it is decided at step S3 that the start key 304 is pressed, the sensor inputs are received at step S4. Next, at step S5, the input signals of the various switches of the operational panel 221 are received to be stored in the RAM in the printer controller 201. Then, at step S6, the level of the maximum light-emission of the laser diode 264 is set by changing the gain of the gain switch 255 according to the values obtained at steps S4 and S5.

Next, at step S7, the above-mentioned automatic image density control (AIDC) is performed. That is, after the grid voltage $V_G$ and the development bias voltage $V_B$ are set to be prescribed standard values, a toner image of a standard image pattern is formed on the photoconductor drum 41 and the amount of adhered toners of the standard toner image is measured with the AIDC sensor 210. The detected value is stored in the RAM 204 in the printer controller 201. Next, at step S8, the density detection level LBA is selected according to the amount of adhered toners measured at step S7, and the grid voltage $V_G$, the development bias voltage $V_B$ and the code of the original gradation data are also selected according to the density detection level LBA. Next, at step S9, a gradation correction data is calculated on the basis of the original gradation table selected at step S8. Then, at step S10, a known copy action is carried out by using the selected grid voltage $V_G$, the selected development bias voltage $V_B$ and the gamma correction data until the copy action is decided to be completed at step S11

In case of a color image, a copy is needed to be processed for the four colors of cyan, magenta, yellow and black successively and the copy action is repeated for each color.

Figure 22:
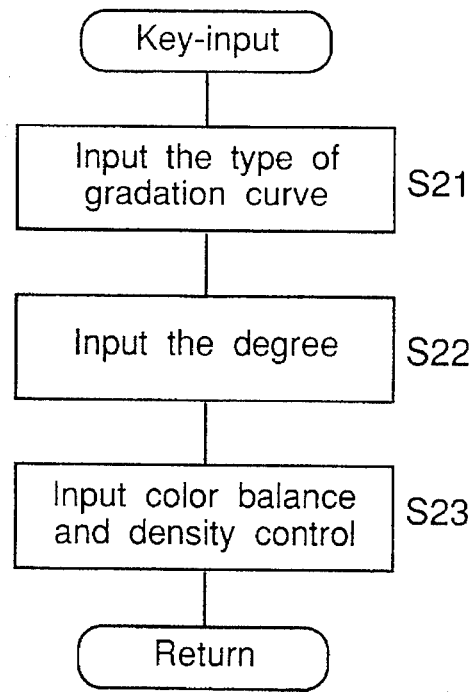
FIG. 22 is a flowchart: of key-input processing.

FIG. 22 shows a flow of the key-input processing (FIG. 21, step S2). First, the type of the shape of the gradation curves are inputted (step S21), and next the degree of the change of the shape from the standard gradation curve is inputted (step S22). Finally, the color balance and the density control value are inputted with the color balance switch 216 and with the operational panel 221. Then, the flow returns to the main flow.

Figure 23:
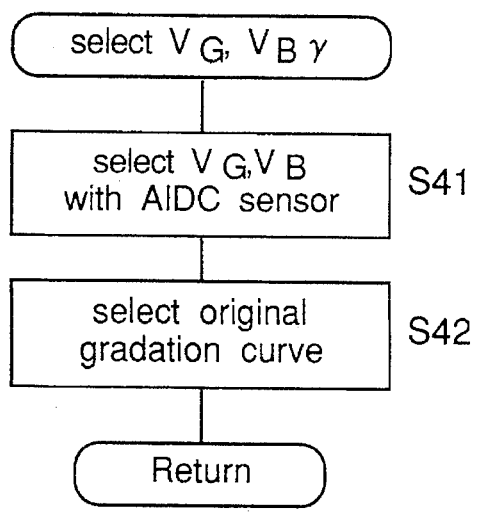
FIG. 23 is a flowchart of the selection of $V_G$, $V_B$ and gradation correction curve.

FIG. 23 shows a flow of the selection of $V_G$, $V_B$ and the gradation data (FIG. 21, step S8). First, the grid voltage $V_G$ and the development bias voltage $V_B$ are selected according to the level of the detected value with the AIDC sensor 210 (step S41). Next, an original gradation curve is selected according to the AIDC level or ($V_G$ and $V_B$) (step S42). Then, the flow returns to the main flow.

(I) Piecewise linear approximation of gradation curve

As mentioned above, a large number of original gradation curves are needed in correspondence to the level of the AIDC sensor 210 and the colors. In the present embodiment, 8-bit data (0–255) are read for the document density, but they are treated as 10-bit data (0–1023) in the calculation in order not to deteriorate the precision. A large memory capacity is needed to store the data of the original gradation curves as a look-up table for the gradation correction. Then, in the present embodiment, the memory capacity needed for the original gradation curves and the gradation curves to be selected by a user can be reduced largely by using the piecewise linear approximation for the curves.

In the piecewise linear approximation, a curve is approximated as piecewise lines for example of ten, and all data for the image input level (0–255) are not stored. The data ROM 203 stores a coefficient X(N) for representing a range of a piecewise line, a gradient coefficient "a(N)" and an intercept coefficient "b(N)" for the N-th line (N=1–10). Then, the N-th piece-wise line is approximated as $y = a(N) \times X + b(N)$.

In the calculation, gradation correction data are calculated at the image input levels 0–255 from the original gradation curve and the selected gradation curve both stored for piecewise linear approximation, as described above, and they are stored in the data ROM. If the calculated data is also stored by using the piecewise linear approximation, the memory capacity can be decreased further.

It is desirable that the calculated data are approximated as piece-like lines by using the coordinates determined according to the absolute values of the secondary differential of the data.

Figure 24:
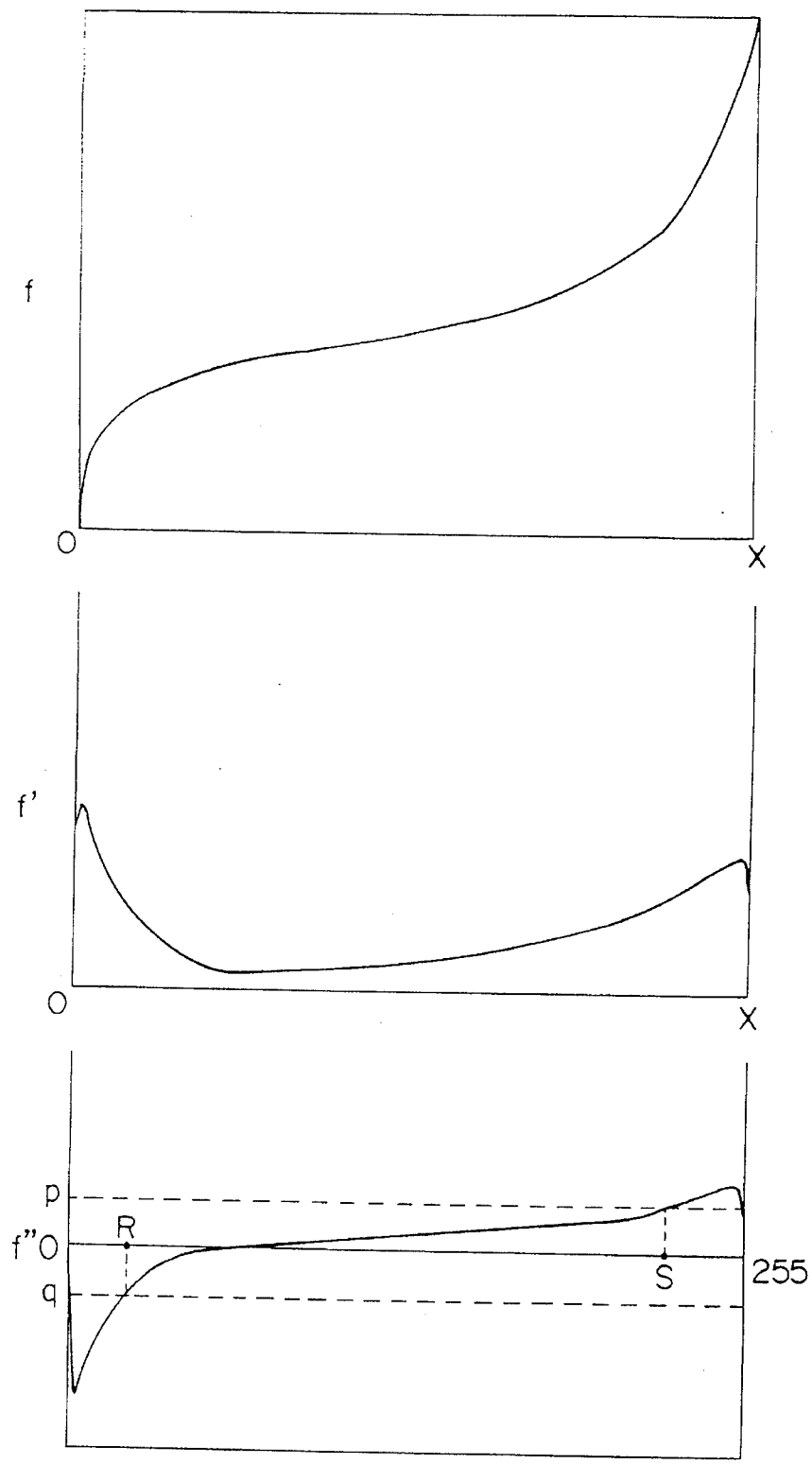
FIG. 24 is a diagram of light emitting data, primary and secondary differential thereof.

FIG. 24 shows light quantity data f(X) at the upper part, and the primary and Secondary differentials f' and f" for the input level X at the middle and lower parts. The secondary value f(X") is a change rate of the gradient of f(X), and a portion having large values of f"(X) is considered as a portion wherein the gradient of f(X) changes sharply. Then, by approximating the portion preferentially as piecewise lines, the precision of the gradation correction can be increased.

In an example shown in FIG. 24, a region wherein $f'' \leq q$ and $f'' \geq r$ is decided for the input level 0–255 wherein q and r denote limit values. Then, if the number of the contact points of the piecewise lines is for example 10, the number of contact points is assigned beforehand according to the prescribed preference, for example 4 points in a region from O to a level R, 4 points in a region from S to 255 and 2 points in the other region. Then, the region O to R is divided into five equal regions, the region S to 255 are also divided into five equal regions (X=S, S+(255−S)/3, S+2×(255−S)/3, 255), and the other region is divided into three (X=R+(S−R)/3, R+2×(S−R)/3). Thus, ten points are determined. These points and the origin are connected with lines successively, and a coefficient X(N) for representing a range of input X, a gradient coefficient "a (N)" and an intercept coefficient "b(N)" are calculated and stored in the RAM for each of the N-th line (N=1–10).

In the printing operation, an output level for laser exposure is calculated for an input image data X from the image reader section by using appropriate a(N) and b(N) for the piecewise linear approximation, and a laser beam is emitted according to the calculated output level.

The preference or the values of p and q can be determined according to the number of the piecewise lines for the approximation. The high-light portion or the low density region near the origin may be determined preferentially.

Such setting may be determined according to the model of the machine In the decision of secondary differential f", the values of p and q may be determined differently. It is also possible to divide the region by using the absolute value of f" only with p.

In the above-mention example, the points are determined according to the number of the points determined beforehand. However, the points may also be determined by dividing the region 0–255 by more than the predetermined number, and the points of larger: f" value may be adopted. For example, the values of f" are calculated for every 4 of X such as f"(4), f"(8), f"(12) and so on, and larger nine points except 0 and 255 are selected from the values of differential value.

If the obtained values for the piecewise linear approximation are stored in the RAM, they can be used repeatedly if the same original gradation curve is selected again.

Further, the precision of the calculation can be improved if the number of the points of an original gradation curve is larger than that of a gradation correction data. For example, the original gradation curve is approximated with for example twenty piecewise lines while the calculated gradation correction data is approximated with ten piecewise lines.

(J) External Memory

A gradation curve can also be inputted from an external memory device such as an IC card. In the operational panel shown in FIG. 5, two IC cards can be inserted into the inlets 311 and 312. The memory structure of IC card is determined according to the kind of the printer section 200.

Figure 25:
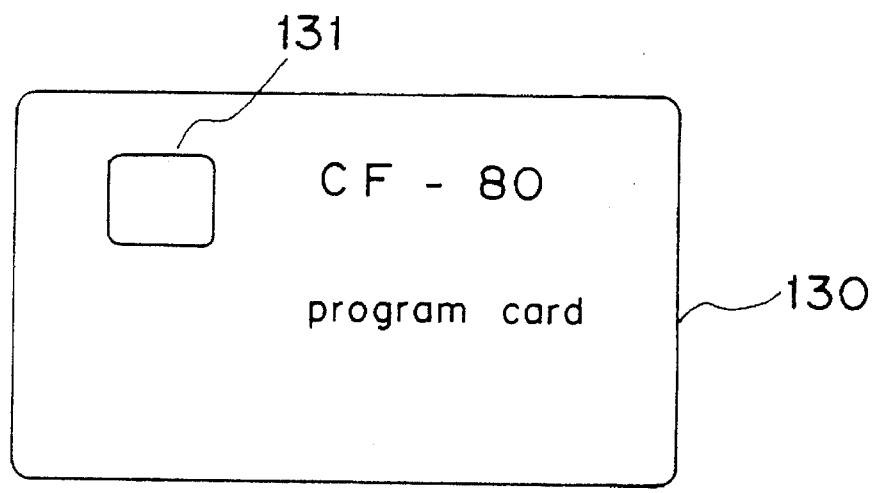
FIG. 25 is a plan view of an IC card.
Figure 26:
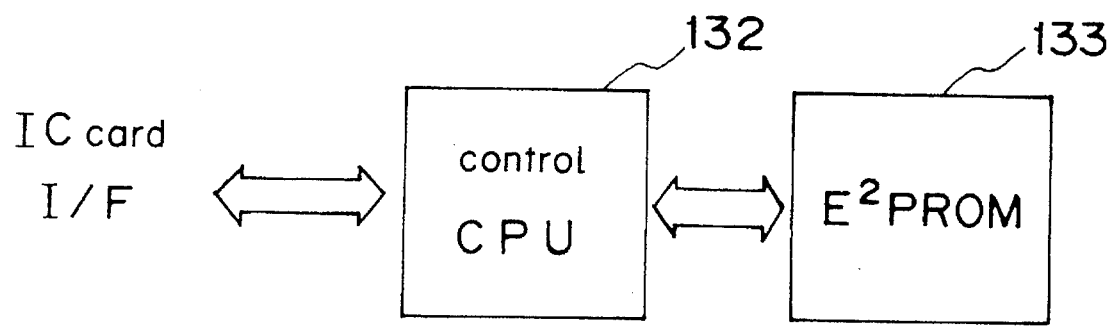
FIG. 26 is a block diagram of the structure of an IC card.

FIGS. 25 and 26 show the external appearance and the inner structure of an IC card. An electrically conductive portion 131 is printed on a body 130 of the IC card. An electric power is supplied through the electrically conductive portion 131, and data can be sent and received through a serial interface.

An control CPU 132 in the IC card controls an E$^2$PROM 133 and the interface with the external. The E$^2$PROM stores data.

Figure 27:
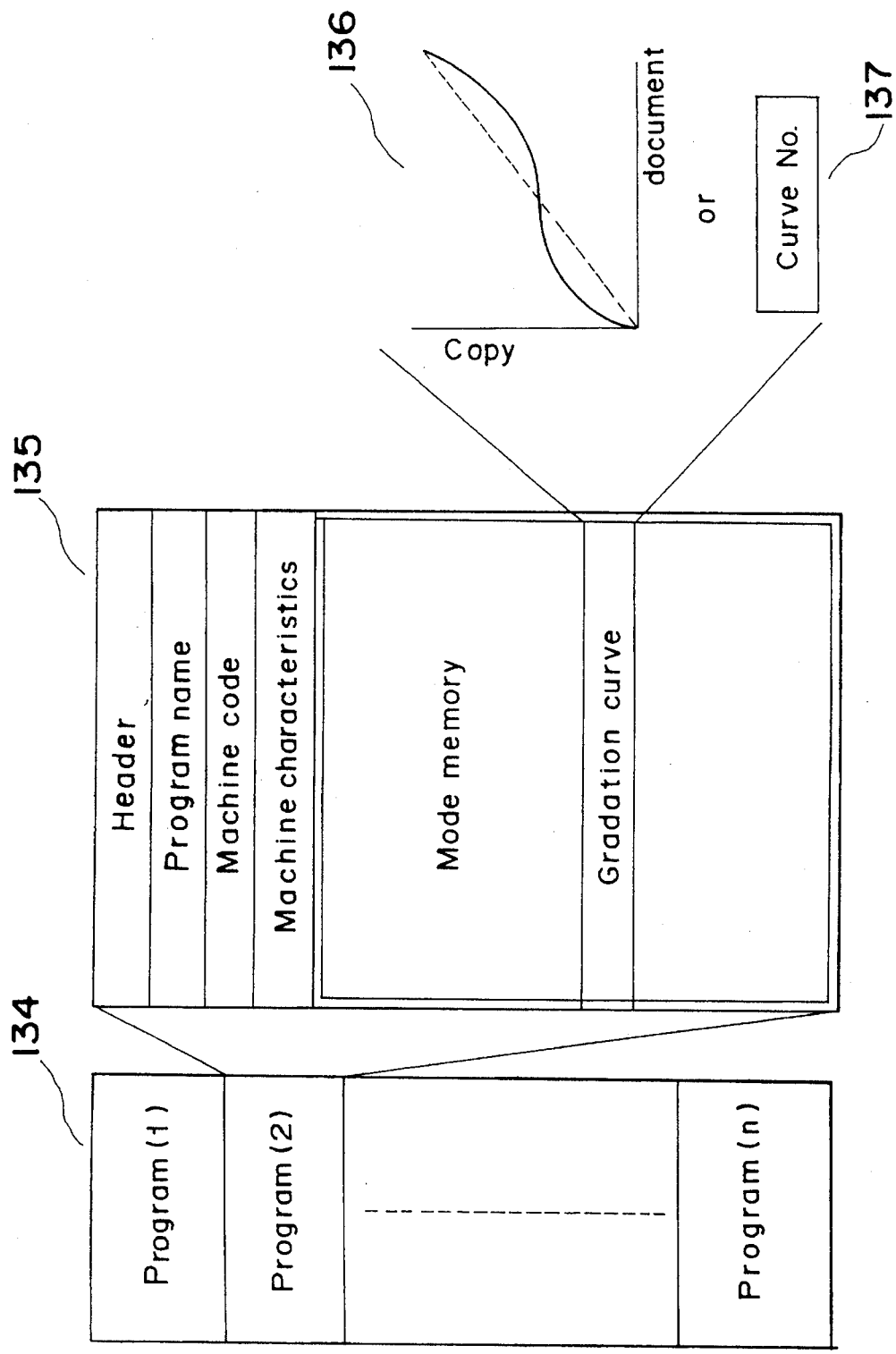
FIG. 27 is a block diagram of the inner structure of an IC card.

FIG. 27 shows the structure of the data 134 stored in the IC card. The data 134 is divided into blocks 135 of variable length, and each block can store program data. Thus, a plurality of programs can be stored in an IC card.

A block 135 consists of various kinds of data explained below. Codes for program register/non-register and the kind of the program are stored in "Header". The name of the program registered by a user is stored in "Program name", and a user can recognize easily the name of the programmer of the program, an object of the program and the like. The code of the machine model is stored in "Machine model". Detailed information of the machine model for which the program is written is stored in "Machine model information" in order to use the IC card in a different model. A copy mode which can be set with the operational panel in various ways is stored in "Mode memory", and by reading the copy mode in "Mode memory", the copy mode which has been set when the program is made can be set again with fidelity. For example, data on a gradation curve is written in the mode memory, and the data includes a desired gradation curve and/or a curve number which designates a selected gradation curve in the gradation curves stored in the data ROM 203 of the main body of the machine.

Because an IC card can store the codes of the model in which the IC card can be inserted, the IC card can store the codes of the model for which it can be used as well as gradation correction data adjusted for each model. Thus, gradation data can be provided for a plurality of models. That is, gradation characteristic can be adjusted for different machines.

Further, additional gradation curves can be stored in an IC card besides the gradation curves stored in the data ROM 203, and the additional gradation curves can be displayed in the operational panel by inserting the IC card. Though a large memory capacity is needed to store many gradation curves, the number of gradation curves can be increased with use of an IC card as an external memory. In this case, a gradation curve can be selected among the gradation curves stored both in the data ROM 203 and in the IC card, and the range for selection can be widened largely from five to nine. The number of gradation curves can be increased further by using a plurality of IC cards each storing different additional gradation curves.

Further, an IC card may have a RAM, and gradation curve data can be stored in a part of the RAM. Then, a new gradation curve created with the editor 160 or the like can be stored in the RAM and the IC card is used as a custom card. That is, by storing a gradation curve prepared newly in an external memory, a user may have a custom card.

Figure 28:
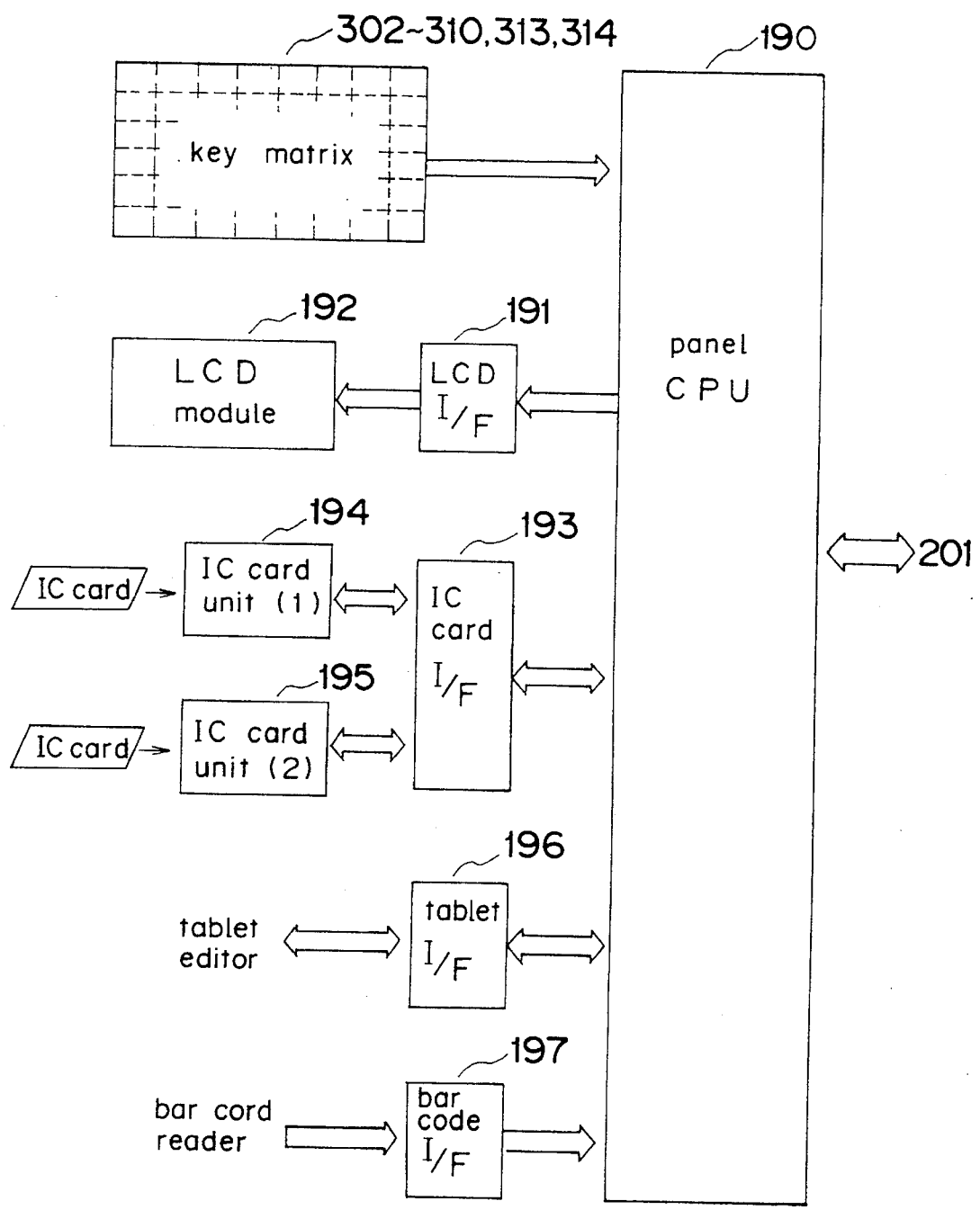
FIG. 28 is a block diagram of the control system of an operational panel.

FIG. 28 shows the control system of the operational panel 221. A panel CPU 190 Controls the operational panel 221 by controlling various input and output devices 191–198. Further, a copy mode set with the operational panel 221 is sent as a command signal to the printer controller 201. Keys 302–310, 313 and 314 forms a key matrix and the ON/OFF states of the keys can be read by scanning the key matrix. An LCD interface 191 consists of an LCD controller, a video RAM, a character generator and the like, and display data set by the panel CPU 190 are converted to data for displaying them on an LCD module 192 of the display 301.

An IC card interface 193 controls two IC card units (IC card reader/writers) 194,195 in correspondence to the IC card inlets 311, 312, detects the insertion of IC card, and discharges the IC card. Because the data transmission is performed through the serial interface with the IC card, the IC card interface 193 reduces the burden of the CPU 190.

A tablet interface 196 controls the data transmission with the above-mentioned tablet 232 or another editor 140, 150, 160.

A bar code interface 197 analyses the data read with the pen 315 and converts to a data format processed by the CPU 190.

Figures 29, 30:
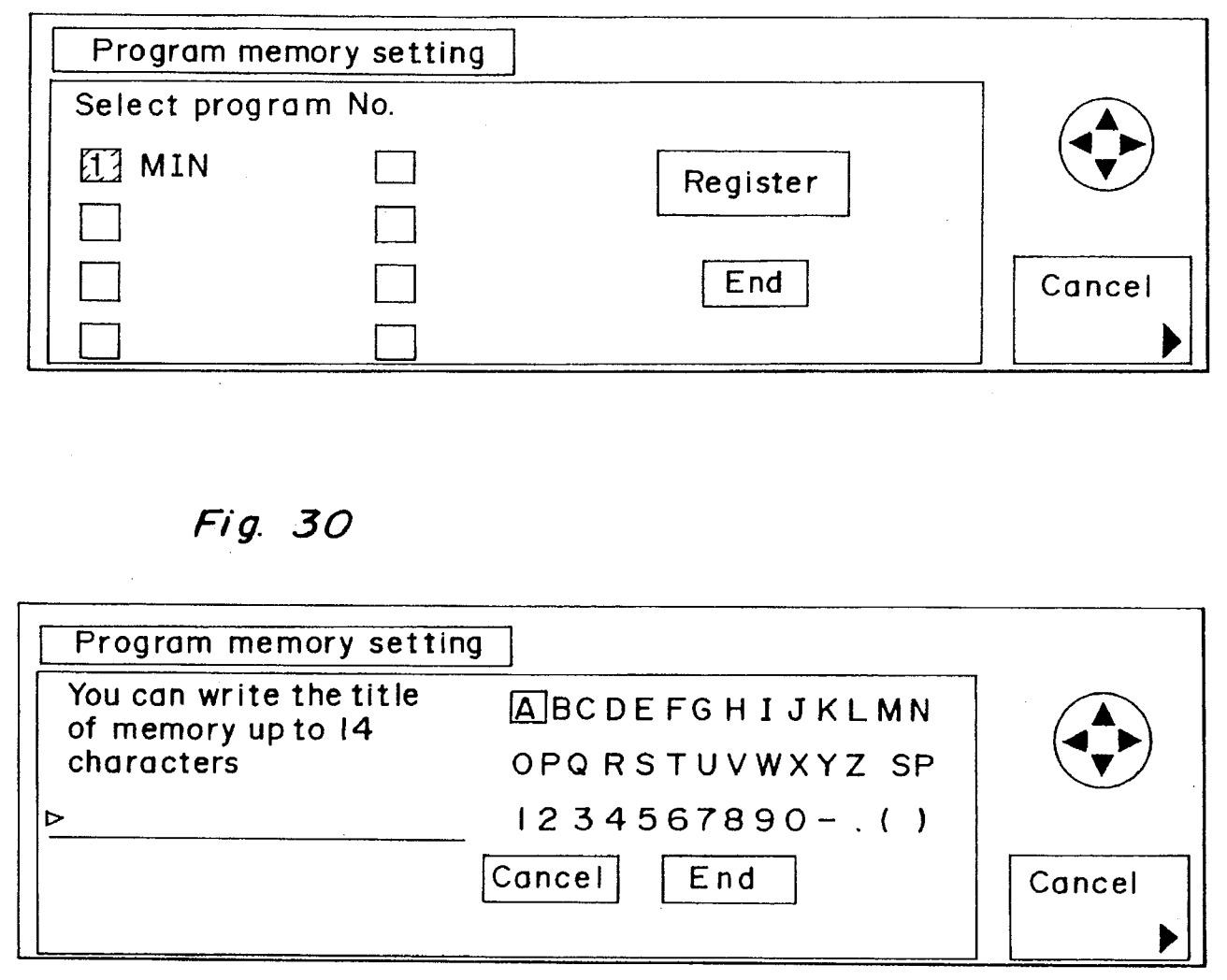

Next, it is explained how to register a gradation curve in the IC card. FIG. 29 shows a picture image of the display 301 for reading the program data in an IC card. The picture image is displayed when an IC card is inserted or when a program call key (not shown) is pressed in the operational panel 221. In the left side of the picture image, programs registered at present among eight kinds of programs which can be registered are shown with the number and the title thereof. Only boxes are displayed for nonregistered programs. When a program is called, a curser is moved for selection with a cursor key 309 to the position of the program, and the enter key 307 is pressed.

Figure 31:
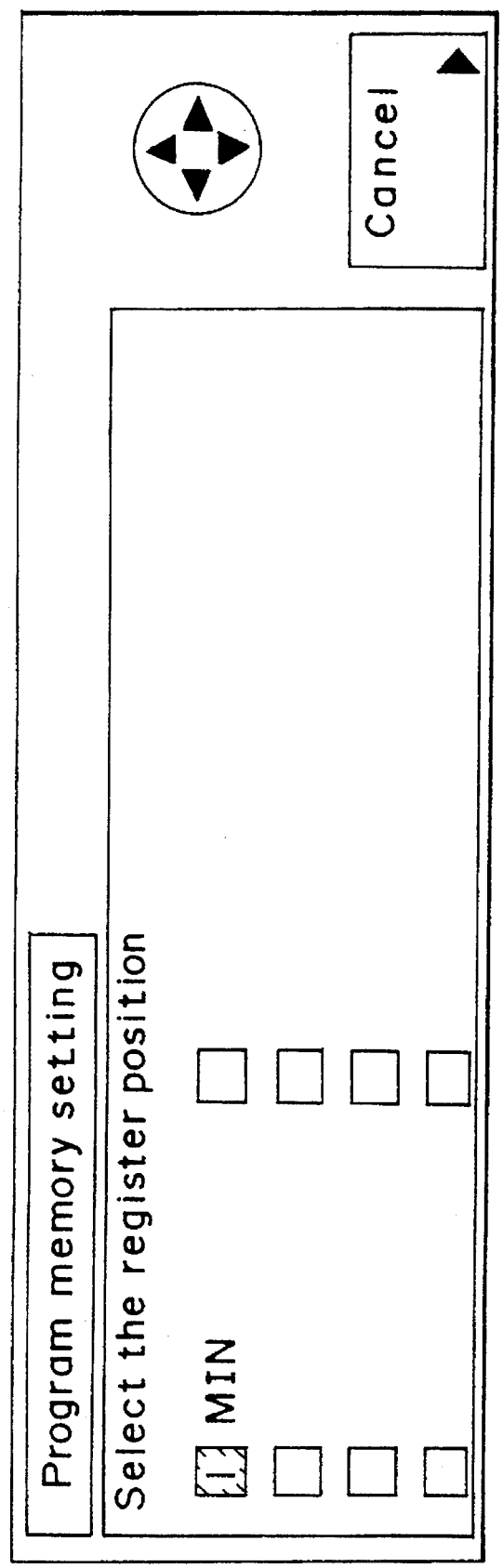
FIG. 31 is a diagram of liquid crystal display of an image for registering a program at a position.

When a program is registered in an IC card, "Program register" in the right side of the picture image is selected, and the enter key 307 is pressed. Then, a picture image shown in FIG. 30 is shown for entering a title. A title is entered in the picture image. Finally, "End" is selected and the enter key 307 is pressed, and a picture image shown in FIG. 31 is shown for program selection. The cursor is moved to a desired position for register and the enter key 307 is pressed. Then, the number and the title are added to the position, and program register completes. The content of the program to be stored is the all setting of the machine at this time.

Therefore, if the program is called again later, the same state can be set again.

In the present invention, two IC cards can be used at the same time, and the procedure for call/register of programs is the same each other.

Figure 32:
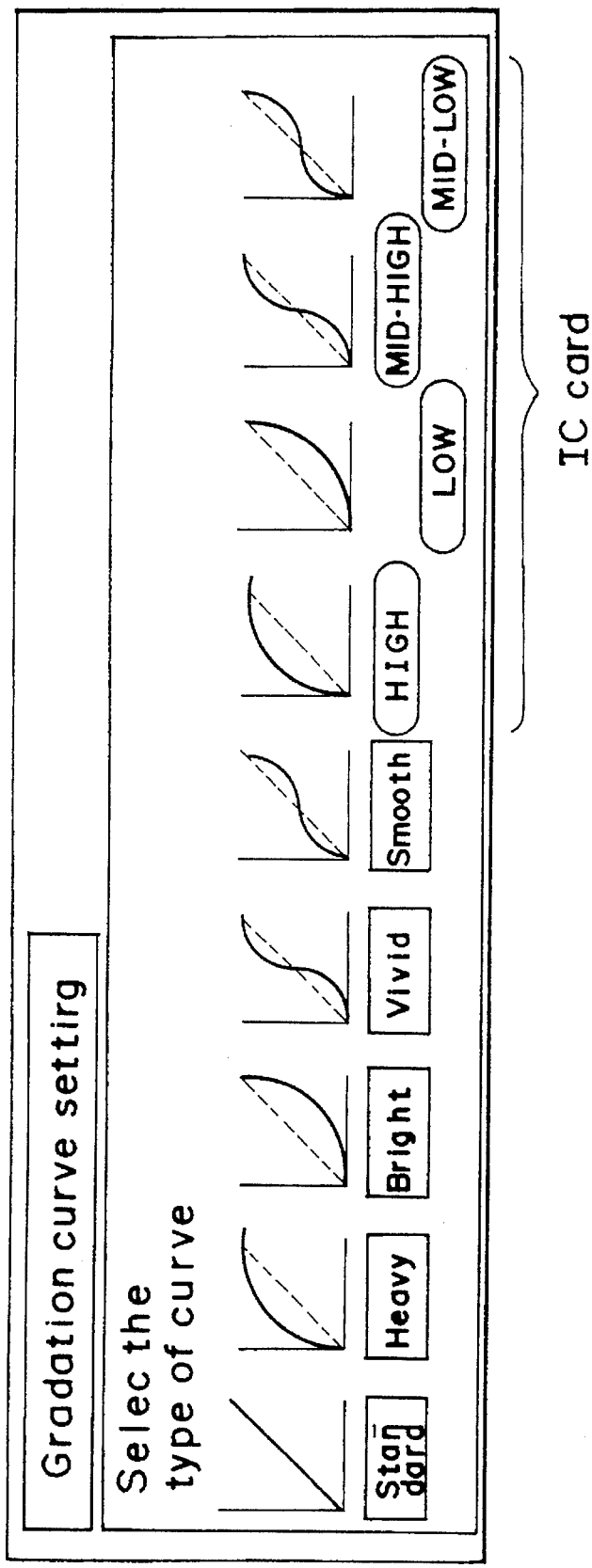
FIG. 32 is a diagram of liquid crystal display of an image for selecting a gradation curve.

Next, it is explained how to select a gradation curve from an IC card. FIG. 32 shows a picture image of the display for selecting a gradation curve when one IC card is inserted. In an IC card, eight gradation curves prepared by a user can be registered for each one program. In the picture image shown in FIG. 32, five gradation curves stored in the main body and four gradation curves prepared by a user are illustrated, and a user can select a gradation curve among the nine.

Figure 33:
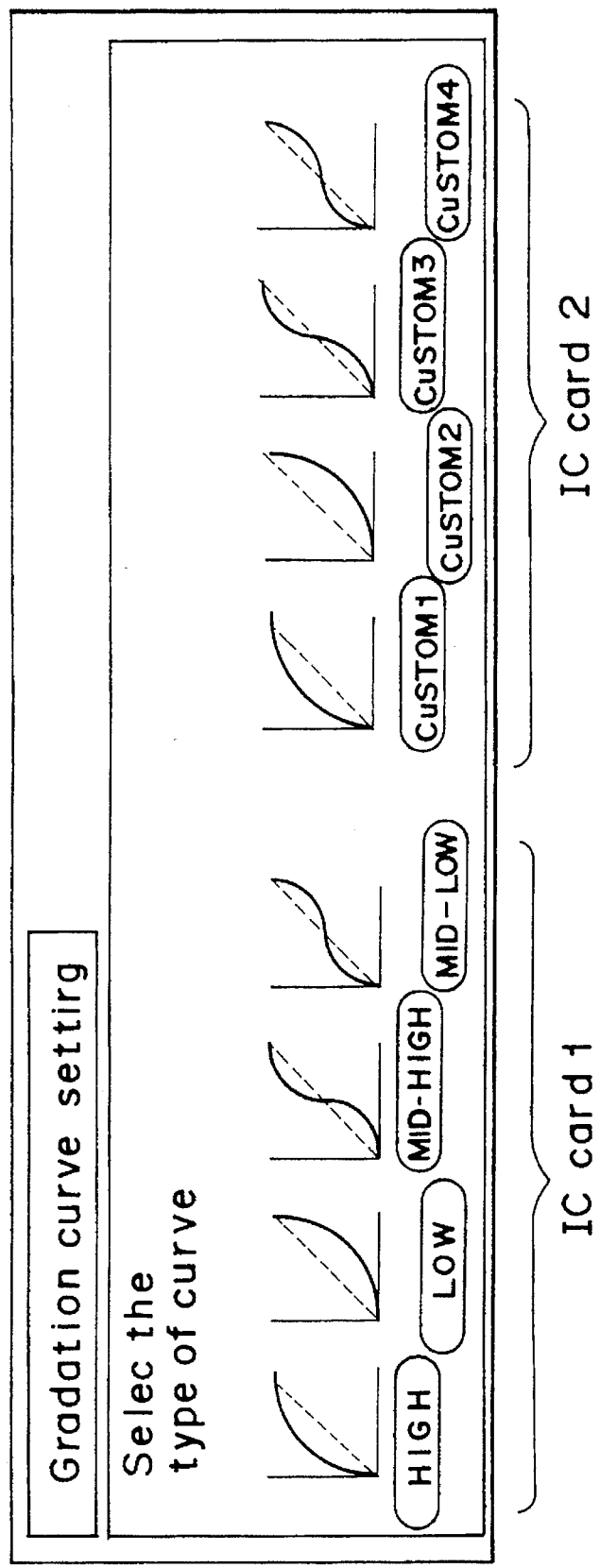
FIG. 33 is a diagram of liquid crystal display of another image for selecting a gradation curve.

FIG. 33 shows a picture image of the display for selecting a gradation curve when two IC cards are inserted. In the picture image, four gradation curves prepared by a user for each IC card are illustrated, and a user can select a gradation curve among the eight gradation curves.

Figure 34:
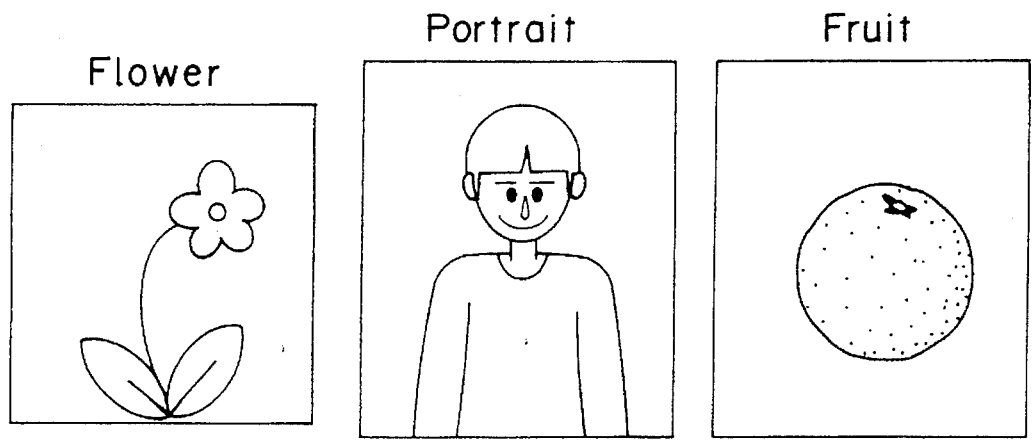
FIG. 34 is a diagram for selecting a gradation curve with a bar code.
Figure 34:
Figure 34:
Figure 34:
Figure 34:
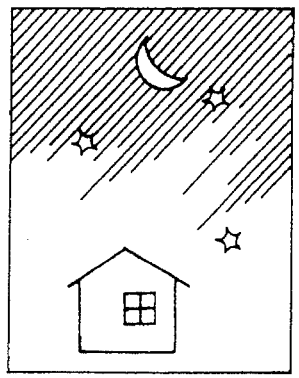
Figure 34:
Figure 34:

FIG. 34 shows an example of selecting a gradation curve with use of a bar code. Bar codes shown in FIG. 34 are provided below five kinds of picture samples of flower, portrait, fruit, color character and dark picture, and a user makes the bar code read below a selected sample to set a gradation curve for the selected picture sample.

Figure 35:
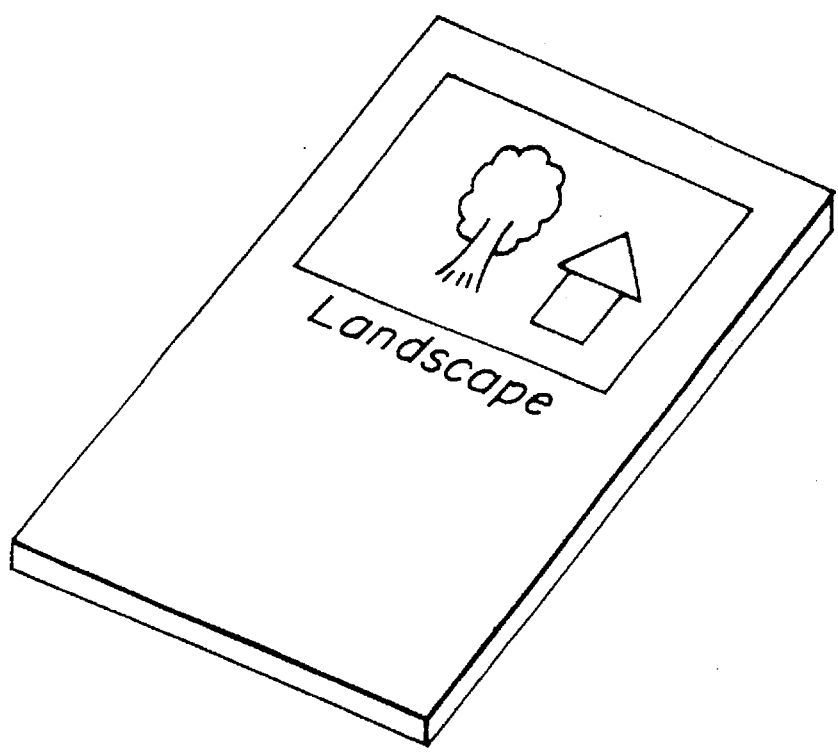
FIG. 35 is a plan view of a card with a sample.

Further, as shown in FIG. 35, a user may attach a sample picture (a landscape in this case) to an IC card for the convenience of the selection of image quality by a user.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image forming apparatus comprising:

a photoconductor;

image forming means for forming an image on said photoconductor by exposing said photoconductor to a light beam;

memory means for storing a plurality of gradation correction data representing a desired relationship of a light quantity data for said light beam to an input image signal obtained by reading a document in correspondance to image forming conditions of said image forming means;

setting means for setting an object gradation characteristic representing a desired relationship of a density of a reproduced image to an input image signal;

determination means for determining the image forming conditions of said image forming means;

read means for reading one of the gradation correction data from said memory means in correspondance to the image forming conditions determined by said determination means;

calculation means for correcting the one gradation correction data read by said read means to obtain a corrected gradation correction data representing the object gradation characteristic set by said setting means; and conversion means for converting an input image signal to light quantity data by using the corrected gradation correction data obtained by said calculation means so that said image forming means forms an image on the photoconductor with said object gradation characteristic set by the setting means.

2. The image forming apparatus according to claim 1, wherein said image forming conditions include a sensitizing potential for sensitizing the photoconductor and a development bias potential for developing a latent image formed on the photoconductor with the beam.

3. The image forming apparatus according to claim 1, wherein said gradation correction data stored in said memory means are data of a curve expressed with a piecewise linear approximation.

4. The image forming apparatus according to claim 1, wherein said corrected gradation correction data calculated by said calculation means is data of a curve expressed with a piecewise linear approximation.

5. The image forming apparatus according to claim 1, said setting means further comprising:

a setting memory for storing a plurality of gradation charcteristics; and a selection means for selecting a gradation characteristic among the gradation characteristics stored in said setting memory.

6. The image forming apparatus according to claim 1, wherein said memory means is removable.

7. The image forming apparatus according to claim 6, wherein said memory means comprises an IC card.

8. The image forming apparatus according to claim 1, wherein said memory means can be removable.

9. The image forming apparatus according to claim 6, wherein said memory means can stored gradation correction data obtained by said calculation means.

10. The image forming apparatus according to claim 6, wherein said memory means stores apparatus model information representing a difference of gradation characteristic of another apparatus model different from that of the apparatus wherein the gradation correction data is obtained.

11. The image forming apparatus of claim 1, wherein the setting means enables an operator to set a nonlinear relationship between the density of the reproduced image and the input image signal.

12. An image forming apparatus comprising:

setting means for setting an object gradation curve representing a desired relationship of an image density of a reproduced image of a document to an input multi-tone image signal obtained by reading the document;

memory means for storing a gradation correction data of a basic gradation curve representing the relationship of an image density to an input image signal;

calculation means for obtaining a gradation correction data of said object gradation curve set by setting means from the gradation correction data of the basic gradation curve; and conversion means for converting a multi-tone input image signal to light quantity data of a beam for exposing a photoconductor to form a latent image by using the gradation correction data obtained by said calculation means to form an image on a photoconductor.

13. The image forming apparatus according to claim 12, wherein said gradation correction data stored in said memory means is data of a curve expressed with a piecewise linear approximation.

14. The image forming apparatus according to claim 12, wherein said gradation correction data calculated by said calculation means is data of a curve expressed with a piecewise approximation.

15. The image forming apparatus according to claim 12, said setting means further comprises:

a setting memory for storing a plurality of gradation characteristics; and a selection means for selecting a gradation characteristic among the gradation characteristics stored in said setting memory.

16. The image forming apparatus according to claim 15, wherein said setting memory is removable.

17. The image forming apparatus according to claim 16, wherein said removable setting memory comprises an IC card.

18. The image forming apparatus of claim 12, wherein the setting means enables an operator to set a nonlinear relationship between the density of the reproduced image and the input image signal.

19. An image forming apparatus comprising:

a printer which is driven by print data to print an image with variable gradation characteristics;

a memory which stores original gradation correction data representing a relationship of print data to input image data;

a setting device which sets a desired object gradation characteristic with which the printer prints an image;

a processor which corrects the original gradation correction data to obtain object gradation correction data in accordance with said object gradation characteristic set by said setting device; and a converter which converts input image data to print data by using the object gradation correction data obtained by said processor, whereby said printer is driven by print data converted by said converter to print an image with the object gradation characteristic set by the setting device.

20. The image forming apparatus according to claim 19, wherein said gradation correction data stored in said memory is a data of a curve expressed with a piecewise linear approximation.

21. The image forming apparatus according to claim 19, said setting means further comprising:

a setting memory for storing a plurality of gradation characteristics; and a selection means for selecting a gradation characteristic among the gradation characteristics stored in said setting memory.

22. The image forming apparatus according to claim 15, wherein said gradation correction data stored in said memory is a data of a curve expressed with a piecewise linear approximation.

23. The image forming apparatus of claim 19, wherein the setting device enables an operator to set a nonlinear relationship between a density of the printed image and the input image data.

* * * * *